US009336576B2

(12) United States Patent
Marchessoux et al.

(10) Patent No.: US 9,336,576 B2
(45) Date of Patent: May 10, 2016

(54) METHOD AND SYSTEM FOR IMPROVING THE VISIBILITY OF FEATURES OF AN IMAGE

(75) Inventors: Cedric Fabrice Marchessoux, Halluin (FR); Arnout Robert Leontine Vetsuypens, Denderbelle (BE)

(73) Assignee: Barco N.V., Kortrijk (BE)

( * ) Notice: Subject to any disclaimer, the term of this patent is extended or adjusted under 35 U.S.C. 154(b) by 266 days.

(21) Appl. No.: 13/996,589

(22) PCT Filed: Dec. 21, 2011

(86) PCT No.: PCT/EP2011/073703
§ 371 (c)(1),
(2), (4) Date: Jun. 21, 2013

(87) PCT Pub. No.: WO2012/085163
PCT Pub. Date: Jun. 28, 2012

(65) Prior Publication Data
US 2013/0287313 A1 Oct. 31, 2013

Related U.S. Application Data

(60) Provisional application No. 61/425,441, filed on Dec. 21, 2010.

(51) Int. Cl.
*G06T 5/00* (2006.01)
*G09G 5/10* (2006.01)

(52) U.S. Cl.
CPC *G06T 5/007* (2013.01); *G09G 5/10* (2013.01); *G09G 2320/0285* (2013.01); *G09G 2320/062* (2013.01); *G09G 2320/066* (2013.01); *G09G 2320/0646* (2013.01); *G09G 2320/0686* (2013.01); *G09G 2340/045* (2013.01); *G09G 2360/16* (2013.01)

(58) Field of Classification Search
None
See application file for complete search history.

(56) References Cited

U.S. PATENT DOCUMENTS

| 4,991,092 A | * | 2/1991 | Greensite | 382/131 |
| 5,542,003 A | * | 7/1996 | Wofford | 382/132 |

(Continued)

FOREIGN PATENT DOCUMENTS

WO 2010039419 4/2010

OTHER PUBLICATIONS

International Search Report for corresponding International Application No. PCT/EP2011/073703 mailed Apr. 26, 2012.

*Primary Examiner* — Sean Motsinger
(74) *Attorney, Agent, or Firm* — Renner, Otto, Boisselle & Sklar, LLP

(57) ABSTRACT

A system and method provide enhanced perceived contrast within a region of interest (102) of an image being displayed in order to enable viewers to more easily perceive subtle features in images, such as during medical diagnostics. The enhanced perceived contrast may be implemented using software only, hardware only, or a combination of hardware and software. If the backlight of a display includes only one or few light sources, the enhanced perceived contrast can be achieved through a software only solution in which the area (104) outside of the ROI (102) is darkened. If the backlight of the display comprises, for example, an LED matrix, enhanced perceived contrast may be implemented through a hardware only solution in which the luminance of the display is increased in the ROI (102). In addition, enhanced perceived contrast may also be achieved through a solution utilizing both hardware and software.

32 Claims, 29 Drawing Sheets

(56) References Cited

U.S. PATENT DOCUMENTS

| | | | |
|---|---|---|---|
| 5,854,851 A * | 12/1998 | Bamberger et al. | 382/132 |
| 7,400,314 B1 * | 7/2008 | Agano | 345/102 |
| 2003/0146897 A1 * | 8/2003 | Hunter | 345/102 |
| 2003/0179219 A1 * | 9/2003 | Nakano et al. | 345/660 |
| 2009/0129657 A1 * | 5/2009 | Huo et al. | 382/132 |
| 2013/0257869 A1 * | 10/2013 | Lao et al. | 345/424 |
| 2013/0287313 A1 * | 10/2013 | Marchessoux et al. | 382/274 |

* cited by examiner

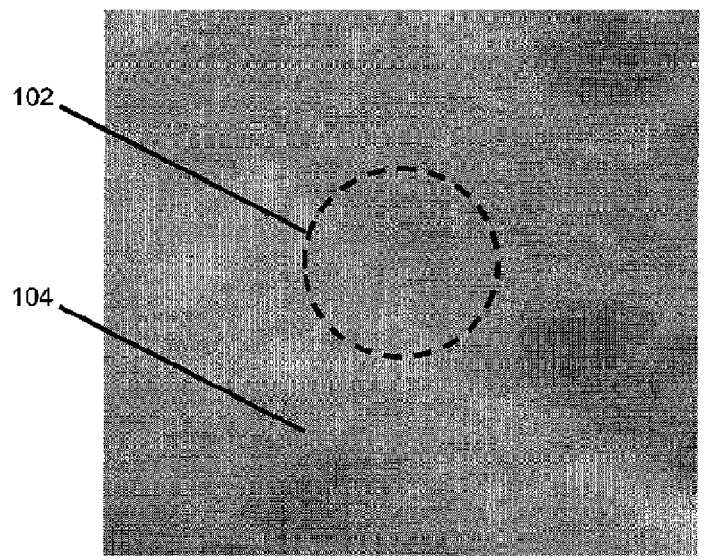
Fig. 4A
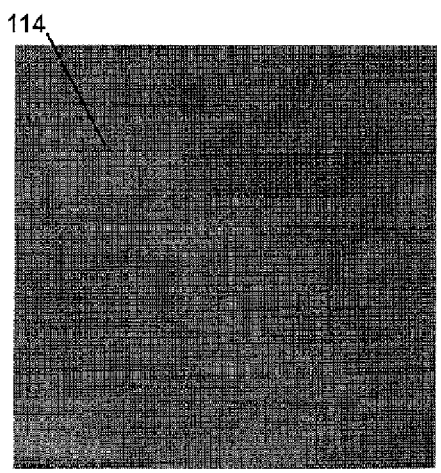 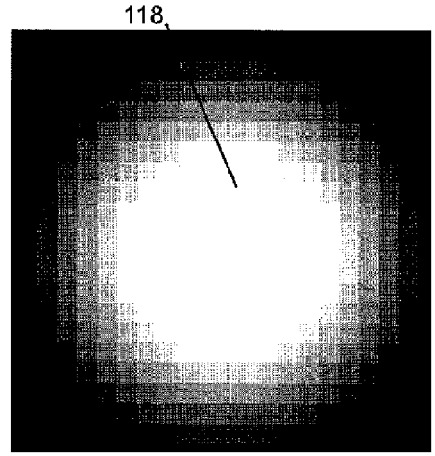
Fig. 4C              Fig. 4D

| 128 | 128 | 127 | 123 | 118 | 113 | 111 | 109 | 107 | 107 | 112 | 113 | 112 | 111 | 110 | 109 | 109 | 109 | 109 | 108 | 107 |
|---|---|---|---|---|---|---|---|---|---|---|---|---|---|---|---|---|---|---|---|---|
| 125 | 127 | 128 | 126 | 121 | 116 | 113 | 110 | 106 | 106 | 109 | 109 | 106 | 105 | 107 | 107 | 109 | 110 | 109 | 107 | 107 |
| 125 | 128 | 131 | 129 | 126 | 122 | 119 | 114 | 108 | 107 | 106 | 107 | 105 | 104 | 105 | 104 | 107 | 109 | 109 | 108 | 108 |
| 124 | 127 | 129 | 129 | 128 | 125 | 122 | 118 | 112 | 106 | 106 | 107 | 105 | 103 | 104 | 103 | 102 | 103 | 106 | 107 | 107 |
| 121 | 124 | 126 | 126 | 125 | 125 | 124 | 120 | 113 | 107 | 105 | 103 | 102 | 101 | 100 | 100 | 99 | 99 | 103 | 106 | 107 |
| 125 | 126 | 126 | 125 | 124 | 124 | 126 | 123 | 116 | 109 | 105 | 101 | 98 | 98 | 97 | 96 | 96 | 97 | 100 | 106 | 109 |
| 126 | 127 | 127 | 126 | 127 | 127 | 127 | 125 | 120 | 114 | 110 | 106 | 100 | 98 | 99 | 98 | 97 | 98 | 101 | 108 | 110 |
| 123 | 125 | 126 | 126 | 127 | 127 | 127 | 125 | 123 | 119 | 117 | 113 | 106 | 103 | 104 | 103 | 102 | 102 | 105 | 110 | 112 |
| 122 | 124 | 124 | 125 | 124 | 123 | 123 | 123 | 123 | 121 | 119 | 115 | 110 | 108 | 107 | 104 | 104 | 105 | 107 | 111 | 113 |
| 121 | 121 | 121 | 121 | 121 | 120 | 119 | 121 | 123 | 122 | 120 | 118 | 113 | 112 | 108 | 105 | 105 | 106 | 108 | 109 | 111 |
| 119 | 120 | 120 | 119 | 119 | 118 | 117 | 119 | 121 | 120 | 119 | 118 | 115 | 112 | 108 | 104 | 104 | 106 | 107 | 108 | 109 |
| 121 | 120 | 119 | 119 | 118 | 118 | 117 | 119 | 120 | 119 | 118 | 117 | 116 | 114 | 111 | 106 | 105 | 106 | 107 | 109 | 109 |
| 124 | 121 | 120 | 121 | 120 | 120 | 121 | 122 | 121 | 121 | 121 | 119 | 117 | 116 | 114 | 108 | 106 | 107 | 109 | 111 | 113 |
| 123 | 121 | 121 | 123 | 122 | 122 | 123 | 125 | 124 | 124 | 125 | 123 | 120 | 118 | 115 | 111 | 108 | 109 | 111 | 113 | 114 |
| 125 | 123 | 121 | 121 | 121 | 122 | 124 | 126 | 125 | 124 | 124 | 124 | 123 | 121 | 120 | 116 | 112 | 111 | 112 | 111 | 111 |
| 127 | 125 | 121 | 120 | 121 | 121 | 123 | 124 | 124 | 123 | 125 | 126 | 125 | 124 | 125 | 121 | 116 | 111 | 109 | 108 | 109 |
| 128 | 127 | 124 | 122 | 123 | 122 | 122 | 122 | 123 | 124 | 126 | 127 | 127 | 127 | 127 | 124 | 118 | 111 | 106 | 108 | 109 |
| 133 | 132 | 130 | 128 | 127 | 124 | 122 | 122 | 124 | 127 | 128 | 129 | 130 | 129 | 128 | 125 | 120 | 114 | 109 | 109 | 110 |
| 140 | 139 | 138 | 135 | 131 | 126 | 124 | 126 | 129 | 130 | 132 | 134 | 133 | 131 | 130 | 127 | 123 | 118 | 113 | 109 | 109 |
| 142 | 142 | 143 | 140 | 134 | 129 | 128 | 129 | 131 | 132 | 136 | 137 | 136 | 135 | 132 | 129 | 126 | 122 | 117 | 110 | 109 |
| 128 | 130 | 132 | 131 | 129 | 127 | 126 | 125 | 128 | 131 | 133 | 134 | 135 | 133 | 132 | 128 | 124 | 120 | 114 | 113 |  |

METHOD AND SYSTEM FOR IMPROVING THE VISIBILITY OF FEATURES OF AN IMAGE

This application is a national phase of International Application No. PCT/EP2011/073703 filed Dec. 21, 2011 and published in the English language that claims the benefit of U.S. Provisional Application No. 61/425,441 filed Dec. 21, 2010, each of which is hereby incorporated herein by reference in its entirety.

FIELD OF THE INVENTION

The present invention relates generally to image display devices, and particularly to methods and systems for adjusting display parameters of image display devices.

BACKGROUND

When using imaging devices for diagnostic purposes, clinicians often are looking for very subtle image features that can indicate the presence of disease. It is well known that brighter displays provide clinicians with the ability to see more subtle features as compared to darker displays having the same physical contrast. It is for this reason that medical displays in particular are typically designed to be as bright as possible with the best achievable contrast.

Typical medical displays are either transmissive or emissive. Transmissive displays, such as Liquid Crystal Displays (LCDs), utilize a backlight with one or more light sources, such as Cold Cathode Fluorescent Lamps (CCFLs), Light Emitting Diodes (LEDs) and the like, and a dedicated optical component, such as a liquid crystal layer, which may be combined with additional optical layers, e.g. polarizers. Because liquid crystals merely modulate and do not emit light, LCDs are considered transmissive displays. Unlike transmissive displays, emissive displays, e.g., organic light emitting diode (OLED) displays polymer light-emitting diode (PLED) displays or electroluminescent displays (ELDs), utilize materials that emit light.

Of course, it is known that higher luminance results in higher heat levels which speeds up degradation and decreases efficiency. And increasing the current (drive level) sent through the display (in case of an emissive display) or the backlight of the display (in case of a transmissive display), increases the rate of degradation. For example, if the backlight of a display with two layers (a backlight and an LC layer) is continuously driven to produce maximum luminance output, degradation will occur much more quickly as compared to the same backlight that is driven to produce a lower luminance output.

In certain circumstances, such as in clinical evaluation of patient images, it may be desirable for users of displays to examine specific features present in only part of an image. Accordingly, it may be desirable to provide a method for increasing the visibility of features in part of an image.

SUMMARY OF THE INVENTION

The present invention provides a system and method for improving the visibility of subtle image differences in a target area of an image.

The system and method provide enhanced perceived contrast (i.e., the perceived difference in luminance between adjacent video levels) within a region of interest ("ROI") of an image being displayed. The ROI may be defined using any technique known in the art (e.g., a mouse, pen, stylus touch screen, remote control, smart phones, tablets, gaze tracking technology, etc). The region of interest may take the form of any shape, such as a circle, oval, square, rectangular, or custom shapes. In one embodiment, the ROI is circular to help draw the user's gaze to the center of the circle, which may result in improved diagnostics due to increased user concentration.

For example, if a backlight of the display includes only one or few individually controllable light sources, the enhanced perceived contrast may be achieved through a software only solution (e.g., a solution that does not alter the driving levels of the display's light source(s)) in which the area outside of the ROI is darkened. If the backlight of the display comprises, for example, an LED matrix, OLEDs, or quantum dots, which can be controlled individually or in clusters that contain a limited subset of the entire matrix, enhanced perceived contrast may be implemented through a hardware only solution (e.g., a solution in which the driving levels of a portion of the display's light sources are modified) in which the luminance of the display is increased in the ROI. In addition, enhanced perceived contrast may also be achieved through a solution utilizing both hardware and software. For example, the luminance of a backlight of the display may be increased while the perceived brightness of the area outside the ROI is reduced. In addition, the ROI may be modified (e.g. by modifying the driving pattern of the LC layer) while also modifying the luminance of the backlight corresponding to the ROI.

In addition, while the present invention describes various mechanisms for increasing perceived contrast, such as by modifying LUTs, it should be understood by those of skill in the art that the source image file being viewed on the display is never modified. This feature may be particularly useful when the images being examined are patient images and where it would be undesirable to modify patient records.

Accordingly, there is provided a method for improving the visualization of a ROI of an image on a display comprising: receiving information defining a ROI of the image, the ROI being a portion of the image; and increasing the perceived contrast of the ROI with respect to at least a portion of the image adjacent the ROI.

The present invention is applicable to both transmissive and emissive displays. According to one aspect, an n-layer is display is utilized, "n" representing the number of layers of the display including the layer driven in accordance with the image table. For example, a typical LCD display may be a 2 layer display having a backlight layer and an LCD panel layer. One of the display layers may either emit light with a specific 2D spatial profile that can be altered (e.g., an emissive layer), or spatially modulate impinging light by transmitting or partially absorbing the light (e.g., a modulating layer). An example of a 1-layer display is an OLED display. Examples of emissive layers include OLED displays, quantum dots, and LED backlights with matrices of LEDs that can be controlled either separately or in clusters, resulting in a specific controllable 2D light profile. Liquid crystal layers are examples of modulating layers.

There is also provided a method for improving visualization of a region of interest of an image on an n-layer display. The method includes receiving information defining a region of interest of the image, the region of interest being a portion of the image; determining the portion of the image table corresponding to the region of interest; and modifying information corresponding to information contained in the image table and/or the driving levels of one or more layers of the n-layer display such that the perceived contrast of the region of interest is higher than the perceived contrast of a portion of the image that excludes the region of interest.

According to one aspect, the n-layer display may be a single layer display.

According to one aspect, the n-layer display may include at least one locally controllable light source, and wherein modifying the driving levels comprises modifying the digital driving levels of at least one of the at least one light source.

According to one aspect, at least one of the layers of the n-layer display corresponds to a locally controllable light source, such as a plurality of LEDs.

According to one aspect, the method further includes calculating a shape based on the received information defining a region of interest and driving the LEDs to simulate the calculated shape.

According to one aspect, information defining multiple regions of interest is received; an image table corresponding to each region of interest is determined; and for each region of interest the corresponding information contained in the image table and/or the driving levels of one or more layers of the n-layer display is modified such that the perceived contrast of the region of interest is higher than the perceived contrast of a portion of the image that excludes the region of interest. Each of the image tables may merely be a defined portion of a larger image table corresponding to a region of interest.

According to one aspect, the ROI is non-circular.

According to one aspect, the ROI is a volume.

According to one aspect, the n-layer display is a three dimensional display.

According to one aspect, the method may further include transitioning between the ROI and the portion of the image adjacent the ROI or the portion of the image that excludes the ROI. In addition, the transitioning may function to reduce perceptual edge enhancement and visual artifacts According to one aspect, modifying the information corresponding to information contained in the image table may include magnifying the image corresponding to the ROI.

According to one aspect modifying the information corresponding to information contained in the image table may include combining a ROI table with a virtual image table. For example, the virtual image table may be a table used to generate the shape of the perceived contrast enhancement ROI table. The perceived contrast enhancement thus may be generated by inserting into the image table the resulting combination of the virtual image and the ROI table, For example, the ROI table and the virtual image table may be multiplied. It may also be desirable to modify the calibration curves of the display to improve perception.

According to one aspect, in a software based implementation the portion of the image table corresponding to the ROI is modified such that the perceived contrast of the ROI is increased.

According to one aspect, the portion of the image table corresponding to the portion of the image that excludes the ROI may be modified such that the perceived contrast of the portion of the image that excludes the ROI is decreased.

According to one aspect, in a hardware based implementation, the luminance of light may be increased in the portion of the display corresponding to the ROI such that the perceived contrast of the ROI is increased. Also, the entire display may be caused to operate at an increased luminance. The perceived contrast of the ROI is higher than the perceived contrast of a portion of the image that excludes the ROI.

According to one aspect, there may be provided a method to facilitate adaptation of the human eye to a change in luminance. It may be suitable to perform adaptation only when the user first selects a ROI, but not if the user relocates the ROI, because the user's eye would already be adjusted to the increased luminance in the ROI. For example, a gradual process may be used to change the luminance of a display from an initial luminance setting to an increased luminance setting. During this gradual increase of luminance the display may continuously adapt its calibration data to remain compliant with a governing standard, such as maintaining the display DICOM GSDF compliant, while accounting for the adaptation process of the human eye. Similarly, the display may also gradually change its luminance level back from the increased luminance setting to the initial luminance setting instead of instantly.

For example, the display parameters (e.g., calibration data) may be modified to correspond to the increased luminance such that the perceived contrast between adjacent levels at the increased luminance setting is greater than the perceived contrast between adjacent levels at the initial luminance setting, and wherein the display parameters are continuously modified during an adaptation period of the luminance increase to match an adaptation of a human eye to the change in luminance from the initial luminance setting to the increased luminance setting. The display settings may be DICOM GSDF compliant at the initial luminance setting, at the increased luminance setting and during the adaptation period. Matching an adaptation of a human eye to the change in luminance from the initial luminance setting to the increased luminance setting may be achieved by altering the display parameters continuously such that the human eye continuously perceives the display to be perceptually linearized.

According to one aspect, there may be provided a medical display system including a display; an image processing controller communicably coupled to the display; and memory communicably coupled to the image processing controller; wherein the image processing controller is configured to operate the display according to the methods for improving visualization of a ROI.

According to one aspect, there may be provided a display system including an n-layer display; an image processing controller communicably coupled to the display; and memory communicably coupled to the image processing controller. The image processing controller may be configured to: receive information defining a region of interest of the image, the region of interest being a portion of the image; determine the portion of the image table corresponding to the region of interest; and modify information corresponding to information contained in the image table and/or the driving levels of one or more layers of the n-layer display such that the perceived contrast of the region of interest is higher than the perceived contrast of a portion of the image that excludes the region of interest.

According to one aspect, the controller is further configured to calculate driving of the LEDs based on the received information defining a region of interest and the spatial luminance patterns generated by the smallest individually controllable clusters According to one aspect, the image processing controller is configured to: receive information defining multiple regions of interest; determine an image table corresponding to each of the regions of interest; and modify information corresponding to information contained in the image table and/or the driving levels of one or more layers of the n-layer display such that the perceived contrast of the region of interest is higher than the perceived contrast of a portion of the image that excludes the region of interest.

For example, the image processing controller may be further configured to modify the portion of the image table corresponding to the ROI such that the perceived contrast of the ROI is increased. In addition, the image processing controller may be configured to modify the portion of the image table corresponding to the portion of the image that excludes the ROI such that the perceived contrast of the portion of the image that excludes the ROI is decreased.

The image processing controller may also be configured to magnify the image corresponding to the ROI, or change the nature of the modifications made to the ROI. For example, the image processing controller may be configured to modify the size of the ROI, the portion of the ROI devoted to transitioning, the portion of the ROI devoted to improving perceived contrast, the foreground or background luminance in the ROI, etc. It may also be desirable to modify the calibration curves of the display to improve perception. In addition, in the case of a color display, the white point may be modified for the region of the display corresponding to the ROI.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIGS. 4A-J illustrate various components of a software only implementation for increasing perceived contrast of a region of interest.

FIG. 4A illustrates a portion of an unmodified image containing a region of interest;

FIG. 4B illustrates an image table corresponding to the image of FIG. 4A;

FIG. 4C illustrates the extracted portion containing a region of interest the image of 4A;

FIG. 4D illustrates an image to be combined with the image of 4C to increase the perceived contrast of the region of interest;

FIG. 4E illustrates an image table corresponding to the image of FIG. 4C;

FIG. 4F illustrates an image table corresponding to the image of FIG. 4D;

FIG. 4G illustrates an image resulting from the combination of the images of 4C and 4D;

FIG. 4H illustrates an image table resulting from the combination of the image tables of 4E and 4F;

FIG. 4I illustrates a portion of the display image of FIG. 4A modified to increase perceived contrast within a region of interest;

FIG. 4J illustrates an image table corresponding to the image of FIG. 4I;

FIG. 5A illustrates an image table and display layer table corresponding to an unmodified image and containing a display region of interest in a 2 layer display;

FIG. 5B illustrates the display layer table and region of interest corresponding to the region of interest in the image table of FIG. 5A;

FIG. 5C illustrates a modified region of interest display layer table;

FIG. 5D illustrates the modified display layer table including the modified region of interest display layer table;

FIG. 5E illustrates the resulting image associated with the table of 5D.

FIGS. 6A-J illustrate various components of a combination software and hardware implementation for increasing perceived contrast of a region of interest;

FIG. 6A illustrates an unmodified image containing a region of interest and a corresponding display table;

FIG. 6B illustrates an image table corresponding to the image of FIG. 6A;

FIG. 6C illustrates the region of interest table extracted from the image table of FIG. 6B;

FIG. 6D illustrates an image table to be combined with the region of interest table of 6C to increase the perceived contrast of the region of interest;

FIG. 6E illustrates a modified region of interest image table resulting from the combination of the image tables of 6C and 6D;

FIG. 6F illustrates a modified image table including the modified region of interest table of FIG. 6E;

FIG. 6G illustrates the display layer table of FIG. 6A including information corresponding to the region of interest in the image table of FIG. 6B;

FIG. 6H illustrates a modified region of interest display layer table;

FIG. 6I illustrates a modified display layer table including the modified region of interest display table of FIG. 6H;

FIG. 6J illustrates a modified image with increased perceived contrast within a region of interest resulting from the image table of FIG. 6F and the display layer table of FIG. 6I;

DETAILED DESCRIPTION

Figure 1:
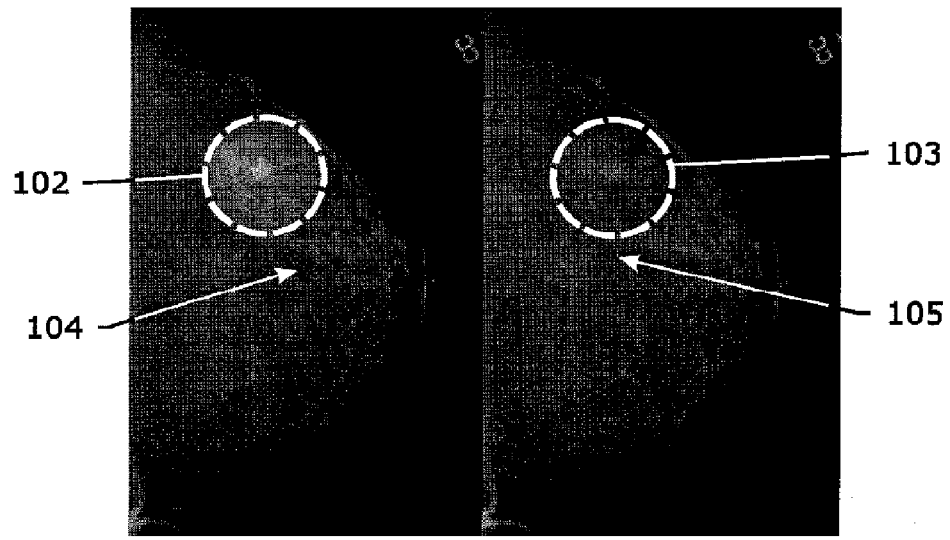
FIG. 1 illustrates an original image and a modified image showing an increase in perceived contrast in a region of interest as compared to the area of the image outside the region of interest.

The present invention relates to a system and method providing the viewer with an increased ability to perceive subtleties in a ROI in an image on a display.

As used herein, the term "display" is intended to refer to any type of display. The term "display" should not be limited to any particular type of display, and includes such things as cathode ray tube devices, transmissive displays, emissive displays, projectors, and any other type of apparatus or device that is capable of displaying an image for viewing.

As used herein, the term "n-layer display" refers to a multilayer display where "n" represents the number of layers of the display including the layer driven in accordance with the image table. For example, a typical LCD display could be considered a 2 layer display having a backlight layer and an LCD panel layer. One of the display layers may either emit light with a specific 2D spatial profile that can be altered (e.g., an emissive layer), or spatially modulate impinging light by transmitting or partially absorbing the light (e.g., a modulating layer). Examples of emissive layers include OLED displays, quantum dots, and LED backlights with matrices of LEDs that can be controlled either separately or in clusters, resulting in a specific controllable 2D light profile. Liquid crystal layers are examples of modulating layers. The emissive and transmissive layers may have varying resolutions. For example, the resolution of an emissive layer including a matrix of LEDs may be lower than the resolution of an OLED emissive layer.

To improve visualization of subtleties in a ROI in an image, there is provided a method for increasing the perceived contrast in the ROI. In other words, the perceived difference in luminance between adjacent video levels is increased in the ROI. The ROI may be defined using any technique known in the art (e.g., a mouse, pen, stylus touch screen, remote control, smart phones, tablets, gaze tracking technology, etc). For example, the enhanced perceived contrast may be achieved through a software only solution in which the area outside of the ROI is darkened. In an exemplary 2 layer display that contains a backlight and an LC layer, the software modification may be complemented by increasing the luminance of the backlight.

If the two-layer display comprises an emissive layer, for example, an LED matrix, enhanced perceived contrast may be implemented through a hardware only solution in which the luminance of the display is increased in the ROI. In addition, enhanced perceived contrast may also be achieved through a solution utilizing both hardware and software. For example, the LC layer of the display may be modified, which corresponds to modifying the image table corresponding to the ROI, which is the software solution. In addition, the luminance of a locally controllable light source of the display may be increased while the area outside the ROI is darkened, which corresponds to the hardware solution.

In addition, to the extent that the luminance of the display is increased, there is provided a method that includes continuously modifying the display parameters during an adaptation period to match an adaptation of a human eye to the change in luminance from an initial first luminance setting to an increased luminance setting. In this manner, the image is continuously adjusted until the viewer's eye is fully adapted.

Figure 2:
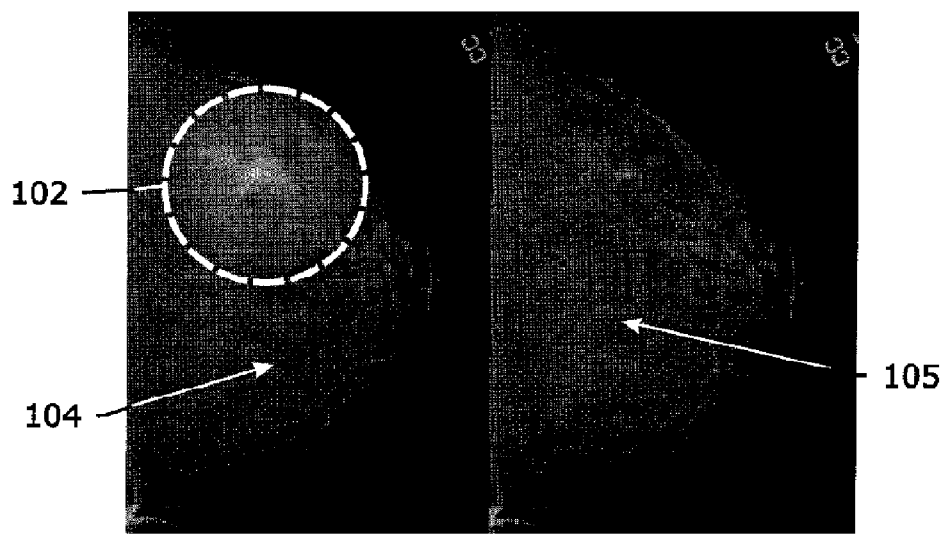
FIG. 2 illustrates an original image and a modified image showing a zoomed in view of a region of interest having increased perceived contrast as compared to the area of the image outside the region of interest.

Turning initially to FIG. 1, there is provided an original image and a modified image showing an increase in perceived contrast in a ROI 102 as compared to the area 104 of the image outside the ROI. FIG. 2 also illustrates an original image and a modified image showing an increase in perceived contrast in a ROI 102 as compared to the area 104 of the image outside the ROI, but shows a zoomed in view of the ROI.

As shown in FIGS. 1 and 2, the perceived contrast in the ROI 102 is higher in the modified image (depicted on the left) compared to the same area 103 in the original image (depicted on the right). The perceived contrast in the ROI is greater than the perceived contrast in the area 104 outside the ROI. In one embodiment, the perceived contrast in the region outside the ROI is unchanged compared to the corresponding region in the original image 105. In one embodiment, the perceived contrast in the area 103 is the same as the perceived contrast in the area 105. The present invention provides methods for achieving the increased perceived contrast. The enhancement of the image to increase perceived contrast may be achieved in a variety of ways. One such way involves transitioning at the threshold between the ROI 102 and portion of the image adjacent the region of interest (i.e., the background).

Figure 3:
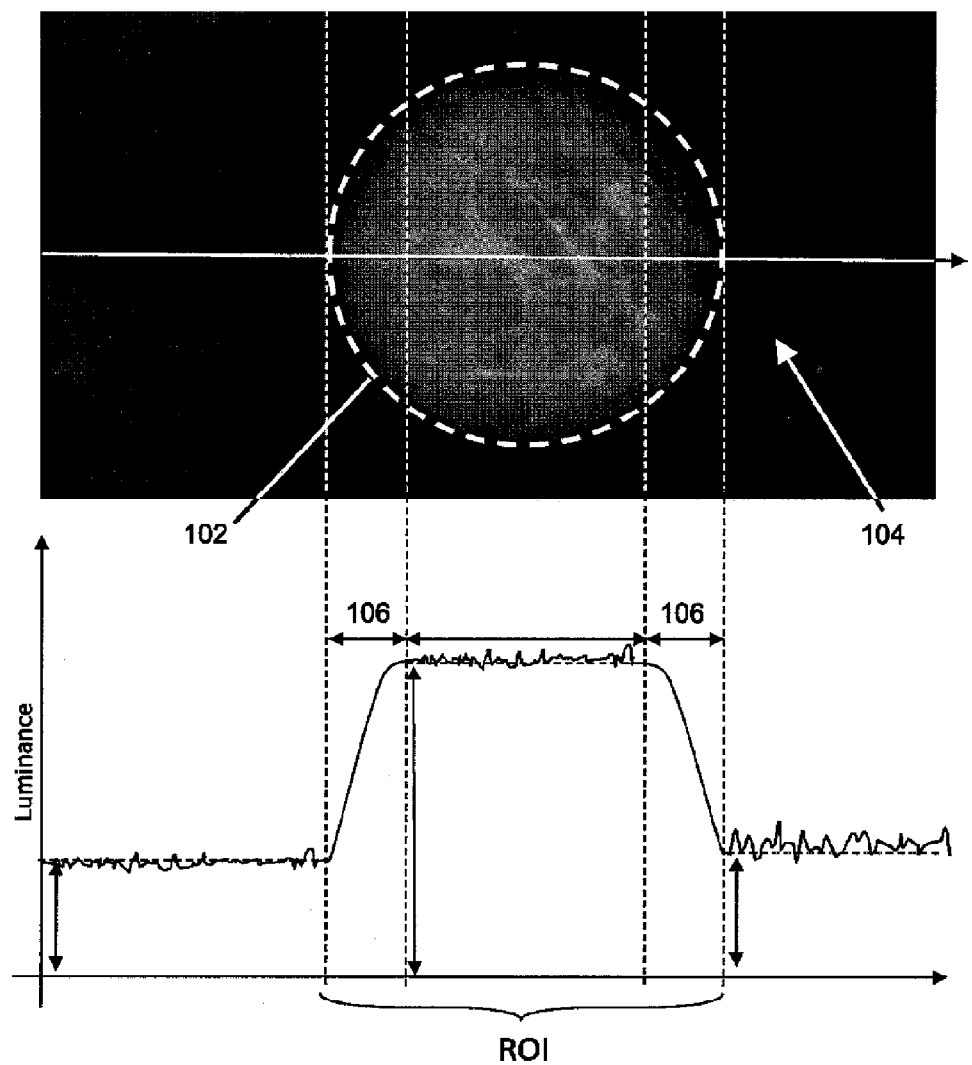
FIG. 3 illustrates the difference in luminance and transitioning area between a modified region of interest and the area outside the region of interest.

FIG. 3 illustrates the difference in luminance between a modified ROI and the background. As shown, the region of interest includes a transitioning area 106 between the ROI and the background. It should be noted that the transitioning area may be part of the ROI 102 or the background 104, but preferably is located at the threshold between the ROI 102 and the background 104. Transitioning may be accomplished by using various methods, such as a Gabor filter, Gaussian blur, or spatial-temporal dithering, as will be understood by those skilled in the art.

In addition, when transitioning is combined with zooming (i.e., magnification) additional compensation may be necessary. For example, additional transitioning may be added to a magnified image through the use of additional dithering techniques.

Features may be provided that enable a user to modify the characteristics of the ROI. For example, the user may be able to move the ROI. Preferably, the system modifies the displayed image as the user moves the ROI such that the user cannot perceive the change in luminance. For example, by moving a predefined ROI shape over a different area of the image, the user may be able to immediately perceive increased contrast in that area. The user also may be able to, zoom in and out, enlarge and shrink the ROI, enlarge or shrink the enhanced contrast portion of the ROI, enlarge or shrink the transitioning area, increase or decrease background luminance, increase or decrease ROI luminance, increase or decrease the gamma value of the display, modify the LUTs of the display, etc.

In addition, various techniques may be utilized to minimize latency associated with the movement of the ROI caused by slow response time of the display. Such techniques are described in U.S. Patent Application No. 2010/0207960, "Devices And Methods For Reducing Artefacts In Display Devices By The Use Of Overdrive," the entirety of which is incorporated by reference.

Also, while the ROI is illustrated as a circle, it will be understood by those of skill in the art that the ROI may have any shape, such as ovular, square, rectangular, or custom shapes, such as Bezier or B-spline curves. In the event that the shape generated is anisotripic, it may be desirable to utilize two dimensional interpolation. The present invention is not limited to any specific shape ROI.

In one specific embodiment, a software application may capture the image of the display. The shape of the ROI may be chosen by means of user input via a software interface. Translation and rotation may be used to move the ROI on the display. The ROI may also be partially transparent. Applying the enhanced perceived contrast may involve, for example, a multiplication of image intensity levels and the ROI with floating values comprised between "0" and "1".

In one embodiment, the ROI is circular to help draw the user's gaze to the center of the circle, which may result in improved diagnostics due to increased user concentration. Also, in one embodiment, additional control parameters may be used to modify additional areas within the ROI. This technique may be particularly useful when the ROI is an anisotropic shape (e.g., an ellipse).

It may also be desirable to include a secondary ROI within the initial ROI. In this case, the system would permit a user to select a ROI for review. During review, the user may wish to further highlight a certain portion of the ROI. Accordingly, a second ROI within the first ROI may be created such that the perceived contrast in the second ROI is greater than the perceived contrast in the initial ROI, which is greater than the perceived contrast of the background.

It may also be desirable to have multiple ROIs for which perceived contrast is enhanced. The perceived contrast in the additional ROI(s) may be enhanced in the same manner as the first ROI. Appropriate controls and user interface options may be adapted for multiple ROI on a single display, as will be understood by those of skill in the art. One example of potential use of such multiple ROI technology involves breast cancer screening, in which several suspicious areas of microcalcifications may be present in a breast. Dedicated computer aided detection software is often used to predict the position of suspicious zones and to predict cancer probability. The ability to increase perceived contrast in a portion of an image could be integrated with the detection software so that once the detection software identifies a suspicious area, the suspicious area could be treated as a ROI, which could then be either manually or automatically enhances using perceived contrast enhancement. In one specific example, the intensity of the ROI may be related to the probability of cancer determined by the detection software. In addition, the size of the ROI may also be determined based on the size of the suspicious areas determined by the detection software.

In addition, it may be desirable to implement the present invention on a system with more than one display (e.g., a system with dual mode displays). In one embodiment, it may be desirable to mirror the ROI on each of the displays. In other words, the ROI occupies the same pixels for each of the images being displayed. In one embodiment, it may be desirable to use a single ROI that is movable from one display to the other by a user. In addition, in a dual layer display having two panels, the first panel may be used to generate the image to be combined with the display image and the second panel may generate the display image. Or, image content may be mixed between the panels.

It should also be understood by those of skill in the art that the enhancement of perceived contrast may be used in a three-dimensional environment. For example, a volumetric, or three dimensional, enhancement may be applied if volumetric medical data is visualized. In its simplest form, the three dimensional shape of the ROI may be a sphere. In general, a three dimensional shape can be created from the two dimensional shape when revolving it around its central axis. In case of a two dimensional display with a three dimensional viewing mode, the voxels that belong to the background may have lower intensities than the voxels belonging to the three dimensional ROI. Voxels belonging to the background may have less transparency than voxels belonging to the ROI. In case of a three dimensional display (volumetric, stereoscopic or auto-stereoscopic, etc.), the light emitted by the display for the background voxel may be decreased in comparison to the light emitted by the display for the background ROI voxels.

In addition, it will be understood by those skilled in the art that because the use of an enhanced perceived contrast permits improvement in perception of only relevant regions of a display, it minimizes veiling glare that may be present in high dynamic range displays.

It will be understood by those of skill in the art that various methods of selecting the ROI may be employed. For example, a human interface device, such as a mouse, pen, stylus touch screen, remote control, smart phones, tablets, gaze tracking technology or the like, may be used to select a ROI. In addition, the ROI may be selected using tracking technology (e.g., infrared gaze tracking or image based face tracking using camera technology, infra red camera tracking, hand detection tracking, gesture recognition, or any other tracking technology), as will be understood by those of ordinary skill in the art.

The perceived contrast in the ROI may be increased using any technique known in the art. It should be understood by those of skill in the art that the adjustment model may take the form of look-up tables (LUTs), algorithms, or other known models. Exemplary LUT implementations are discussed herein.

Although the present invention is applicable to emissive and transmissive multilayer displays, one of ordinary skill in the art will recognize that the spatial light pattern emitted by an emissive layer of a display is typically different (unless a collimated light source is used) than the spatial light pattern that impinges on a modulating layer of a display. In addition, for displays having multiple modulating layers, light exiting a first modulating layer may have a different spatial luminance pattern than light impinging on a second modulating layer. Accordingly, when a software solution is used in the modulating layer to obtain the desired ROI shape, it may be desirable to consider the actual spatial luminance profile that hits that modulating layer as opposed to the luminance uniformity pattern at the level of the previous emitting/modulating layer.

For a 2-layer display having an emissive layer of LEDs and a modulating liquid crystal layer (i.e., an LED backlit LCD), the angular emission profile of the LEDs, combined with the optical foils in the backlight may together determine the spatial light intensity of the light that impinges on the LC material. The spatial light intensity of the light that impinges on the LC material, combined with the modulation of the LC layer, may determine the two dimensional spatial profile of the light intensity emitted by the display, as seen by the observer, when using a LED backlit LCD.

It will be understood by those of skill in the art that enhancing perceived contrast may also be achieved by modifying the area outside the ROI. Specifically, those of skill in the art will recognize that the area outside the ROI can be either decreased, increased (e.g., increased relatively less than the ROI) or remain unchanged. For example, by decreasing the perceived contrast of area of the image outside of the region of interest, the perception of contrast of the ROI may be improved by comparison to its surrounding area without modifying any information corresponding to the ROI. This can be realized in practice by decreasing the luminance output outside the ROI (e.g., simulating a digital lightbox).

Figures 4B, 4E:
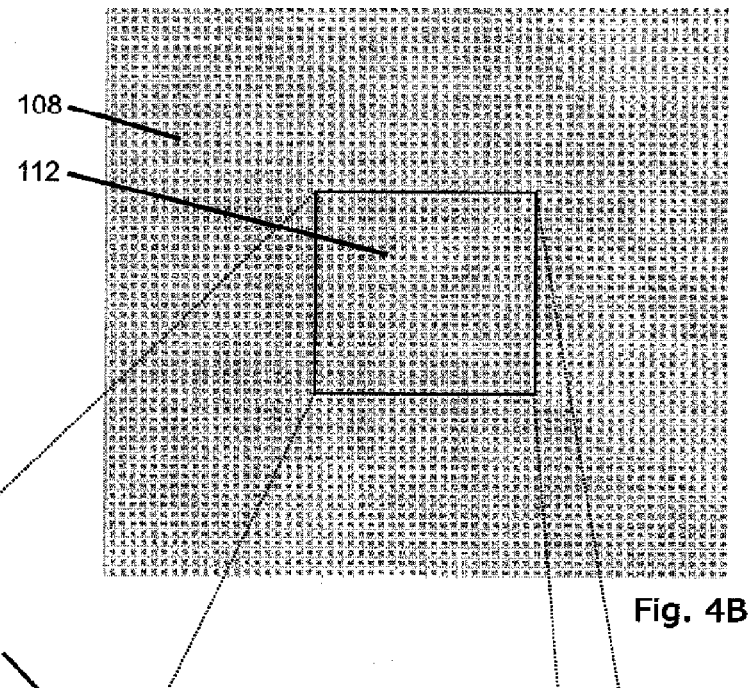

Turning next to FIGS. 4A-J, provided are various components of an exemplary software only implementation for increasing perceived contrast of a ROI. FIG. 4A illustrates a portion of an unmodified image with a ROI 102 and background 104. FIG. 4B illustrates an image table 108 corresponding to the image of FIG. 4A and containing a ROI image table 112 corresponding to the ROI 102 of FIG. 4A. It should be understood by those of skill in the art that the ROI image table 112 and the ROI 102 are indicated slightly different for practical reasons. For example, ROI image table 112 may be made slightly larger than ROI 102 Accordingly, the ROI image table 112 and ROI 102 may not correspond exactly. To the extent that the ROI image table 112 contains regions not included in ROI 102, such regions may be used for transitioning, or potentially to indicate the beginning of the background 104. According to one method for increasing perceived contrast in the ROI 102, the ROI image table 112 of the image table 108 may be extracted.

The extracted ROI image table 112 is illustrated in FIG. 4E and the image 114 associated with the extracted ROI image table 112 is illustrated in FIG. 4C. To increase the perceived contrast in the ROI image 114, a virtual image table, such as an enhanced image table 116 shown in FIG. 4F, may be combined with the extracted ROI image table 112 of FIG. 4E. FIG. 4D illustrates the image associated with the image table 116.

Figures 4F, 4G:
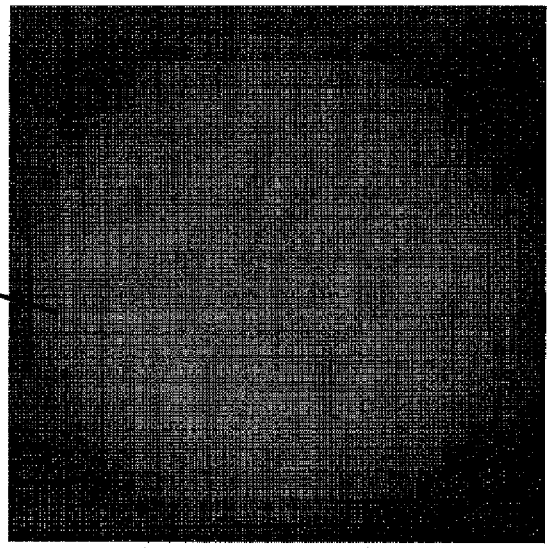
Figures 4H, 4J:
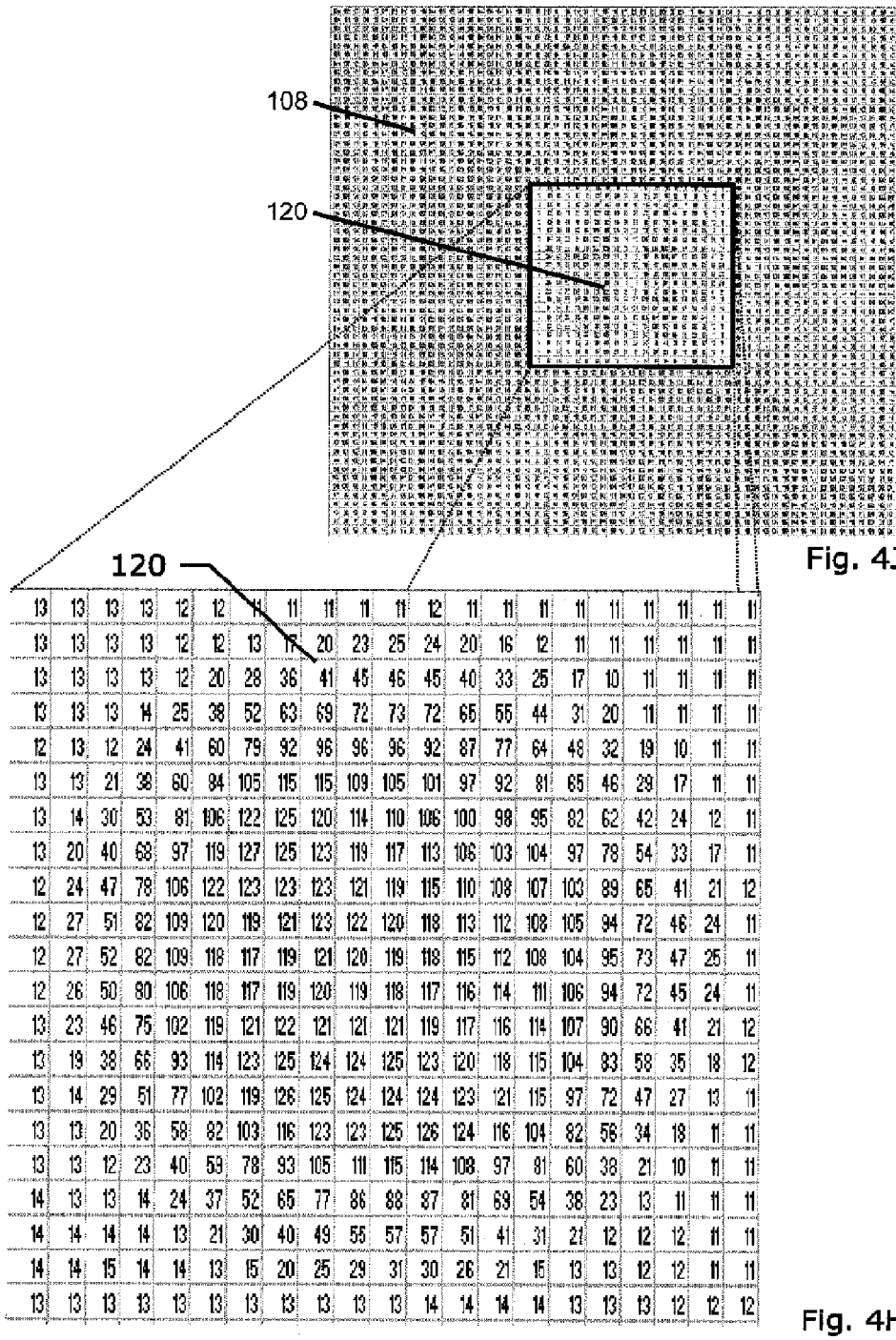
Figure 4I:
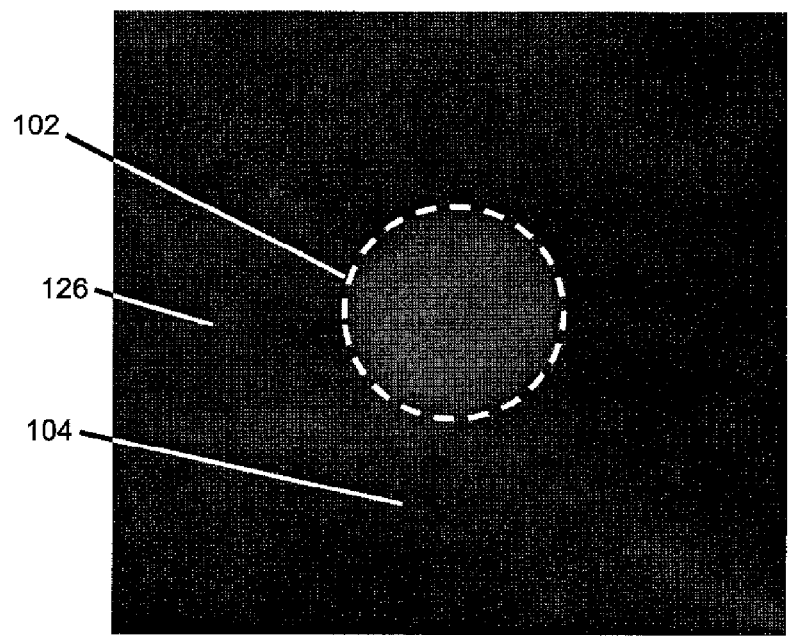

For example, a multiplication table, such as image table 120 of FIG. 4H, may be formed from the tables of FIGS. 4E and 4F as will be understood by those of skill in the art. The resulting image associated with the image table of FIG. 4H is illustrated in FIG. 4G. The image table 120 of FIG. 4H may then be substituted for the extracted ROI image table 112, yielding the image table of FIG. 4J. FIG. 4I illustrates the new resulting image 126 associated with the image table of FIG. 4J. It will also be understood by those of skill in the art that the background portion of the image table 108 may also be modified, such as by increasing or decreasing the luminance. If the background is adjusted, the manner in which the ROI is modified may be altered to compensate for the changes to the background of the image. In addition, while not a software only implementation, the luminance of the entire display may be increased while the background of the image is darkened, which may add to the increased perceived contrast of the ROI as compared to the background.

Figure 5A:
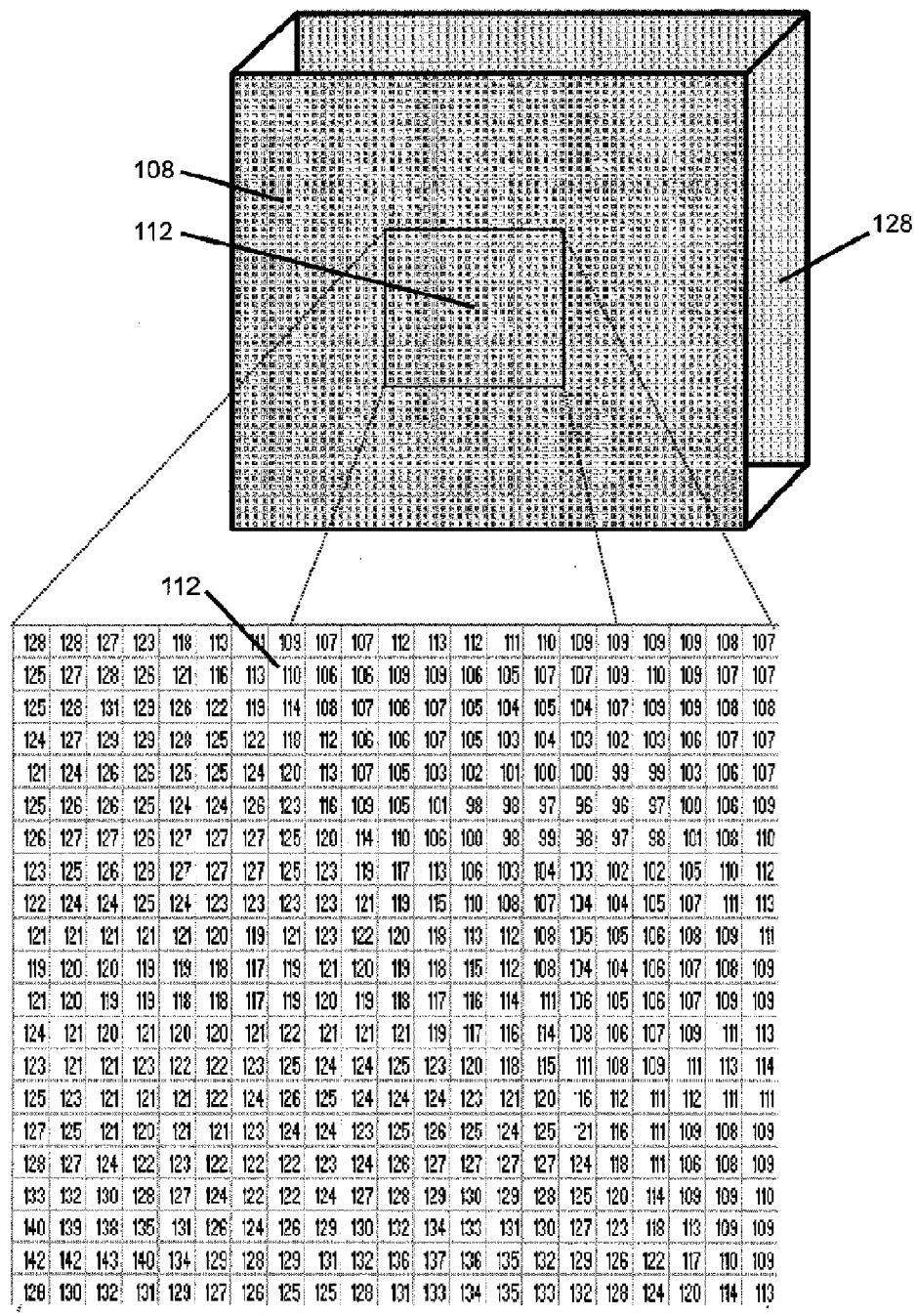
FIGS. 5A-E illustrate various components of a hardware only implementation for increasing perceived contrast of a region of interest.

Turning next to FIGS. 5A-E, provided are various components of an exemplary hardware only implementation for increasing perceived contrast of a ROI. FIG. 5A illustrates a portion of an unmodified image table 108 with a ROI image table 112 and a display layer table 128. The display layer table 128 may correspond to the digital driving values of the individually controllable (sets of) light sources that are used in the backlight, when referring to the example of an LED backlit LCD. Said individually controllable (sets of) light sources may for instance be individual LEDs or blocks that contain several LEDs.

Figure 5B:
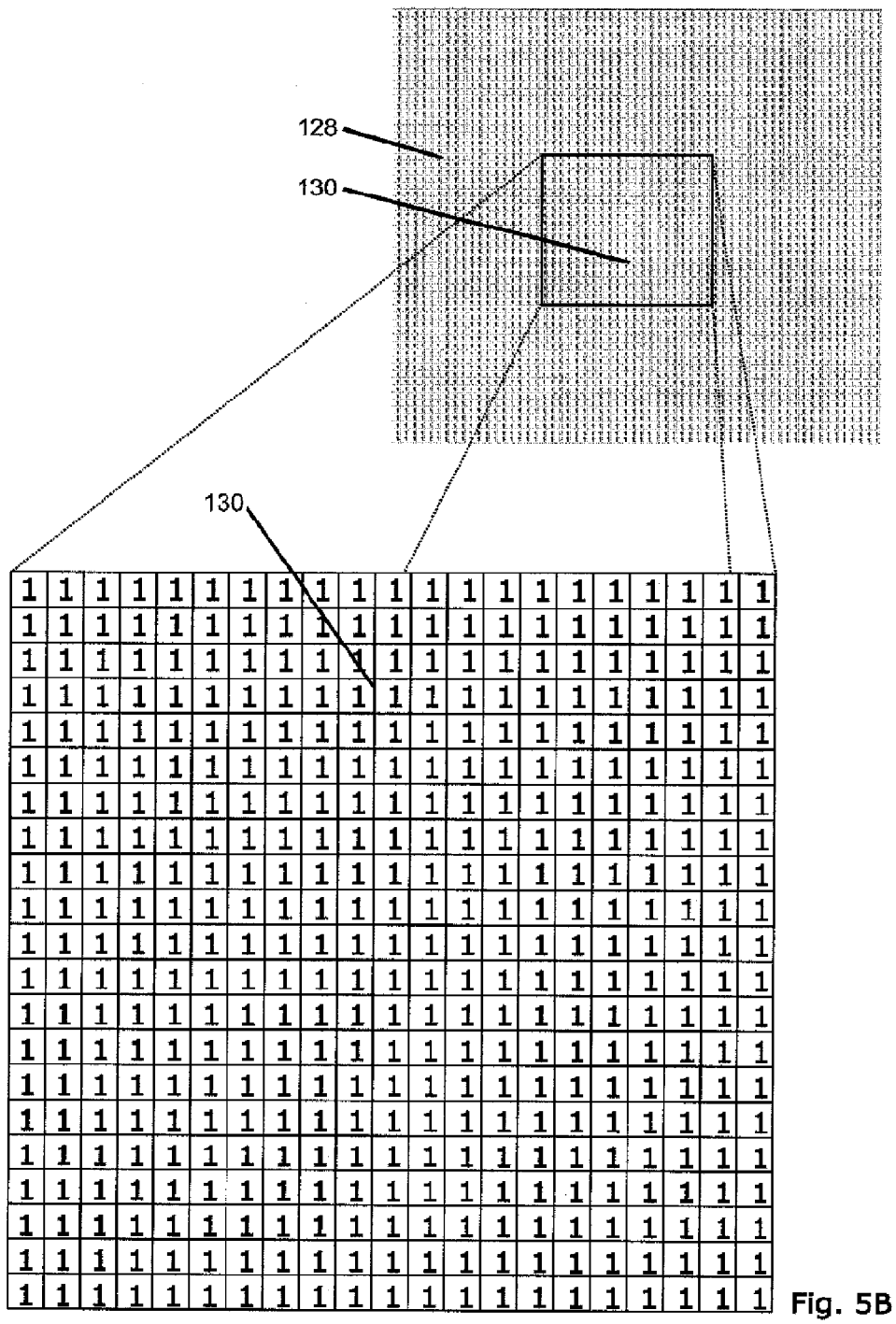
Figures 5C, 5D:
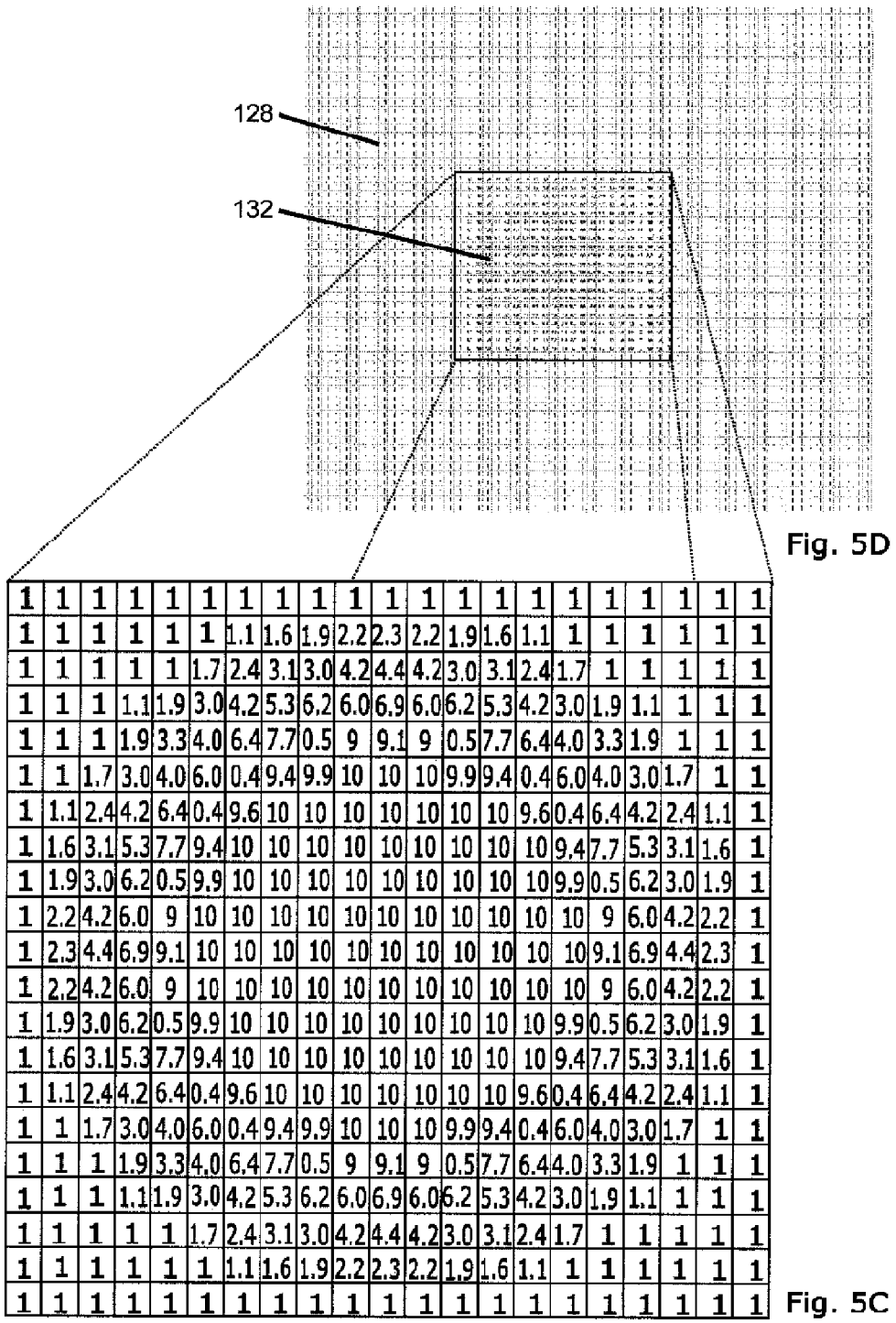
Figure 5E:
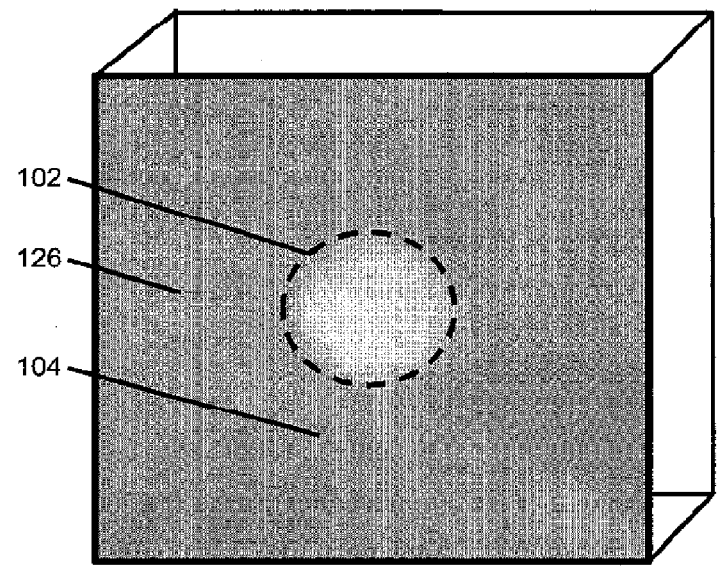

FIG. 5B illustrates the display layer table 128 having a ROI display layer table 130 corresponding to the ROI image table 112 of FIG. 5A. In other words, the ROI display table 130 may be used to alter the eventual luminance emitted by the display in the selected ROI. The ROI display table 130 may be adapted to create the modified ROI display table 132 of FIG. 5C. The modified ROI display table 132 may then be inserted so as to replace the original ROI display table 130, as shown in FIG. 5D. The new resulting image 126 is illustrated in FIG. 5E.

In a hardware only solution, the image table 108 may remain unmodified. Obtaining an appropriate modified display layer table 132 that will result in a desired shape in the ROI may be accomplished using any suitable procedure. For example, the procedure may be based on optical simulations and a mathematical algorithm. The optical simulations can be used to determine the spatial profile the individually controllable (sets of) light sources will generate in the ROI. Based on these spatial profiles, an algorithm such as least squares with a restriction to non-negative digital driving of the light sources may be used to obtain a desired luminance shape to be emitted by the display. Similar optical simulations are typically used during display design where the physical display is not yet available. Alternatively, the spatial profile of the individually controllable (sets of) light sources may be measured using a suitable digital camera if a physical display is available. The resulting measurements may then be used as input for the mathematical algorithm.

Figure 6A:
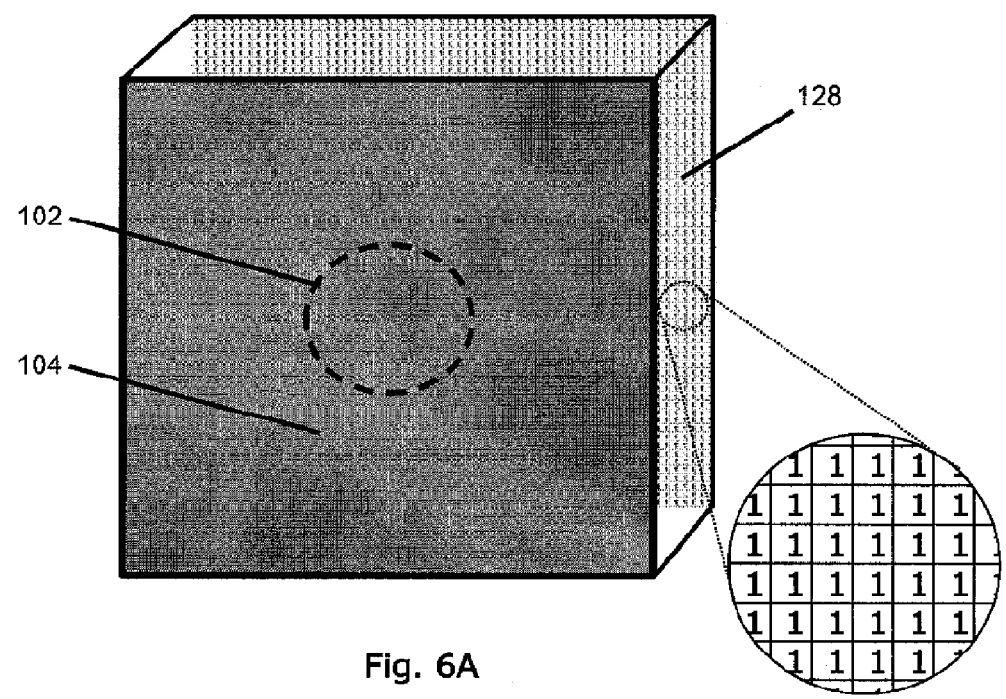
Figures 6B, 6C:
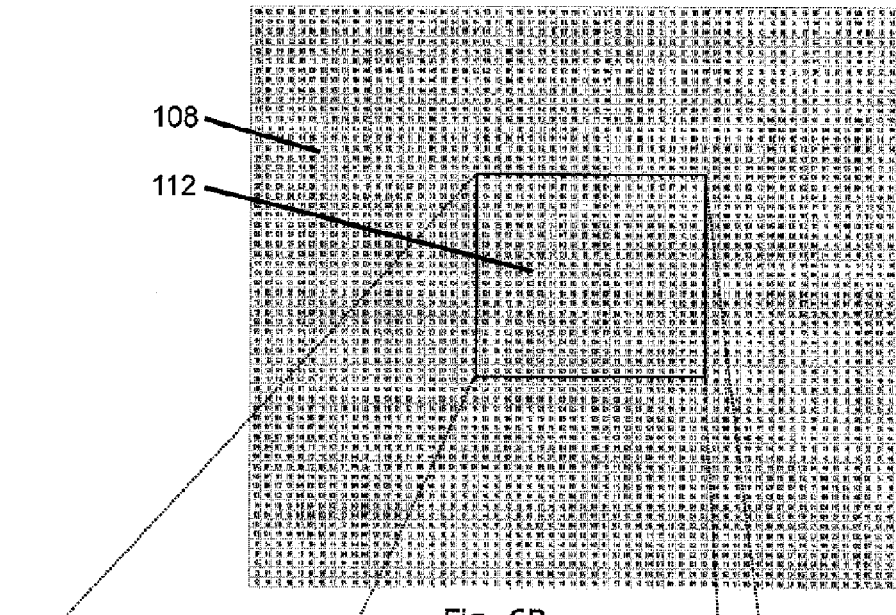

Turning next to FIGS. 6A-J, provided are various components of an exemplary combination software and hardware implementation for increasing perceived contrast of a ROI. As illustrated in FIGS. 6A-F, the image table associated with the display image may be modified as part of the software aspect of the combination software and hardware implementation. FIG. 6A illustrates an unmodified image containing a ROI 102 and a corresponding display layer table 128. This display layer table may be modified as part of the hardware aspect of the combination software and hardware implementation. The unmodified image includes a ROI 102 and a background 104. FIG. 6B illustrates an image table 108 corresponding to the image of FIG. 6A and containing a ROI image table 112 corresponding to the ROI 102 of FIG. 6A. As noted previously, the ROI 112 need not exactly correspond to the ROI 102. The ROI image table 112 may be extracted from the image table 108 to yield FIG. 6C.

Figures 6D, 6E:
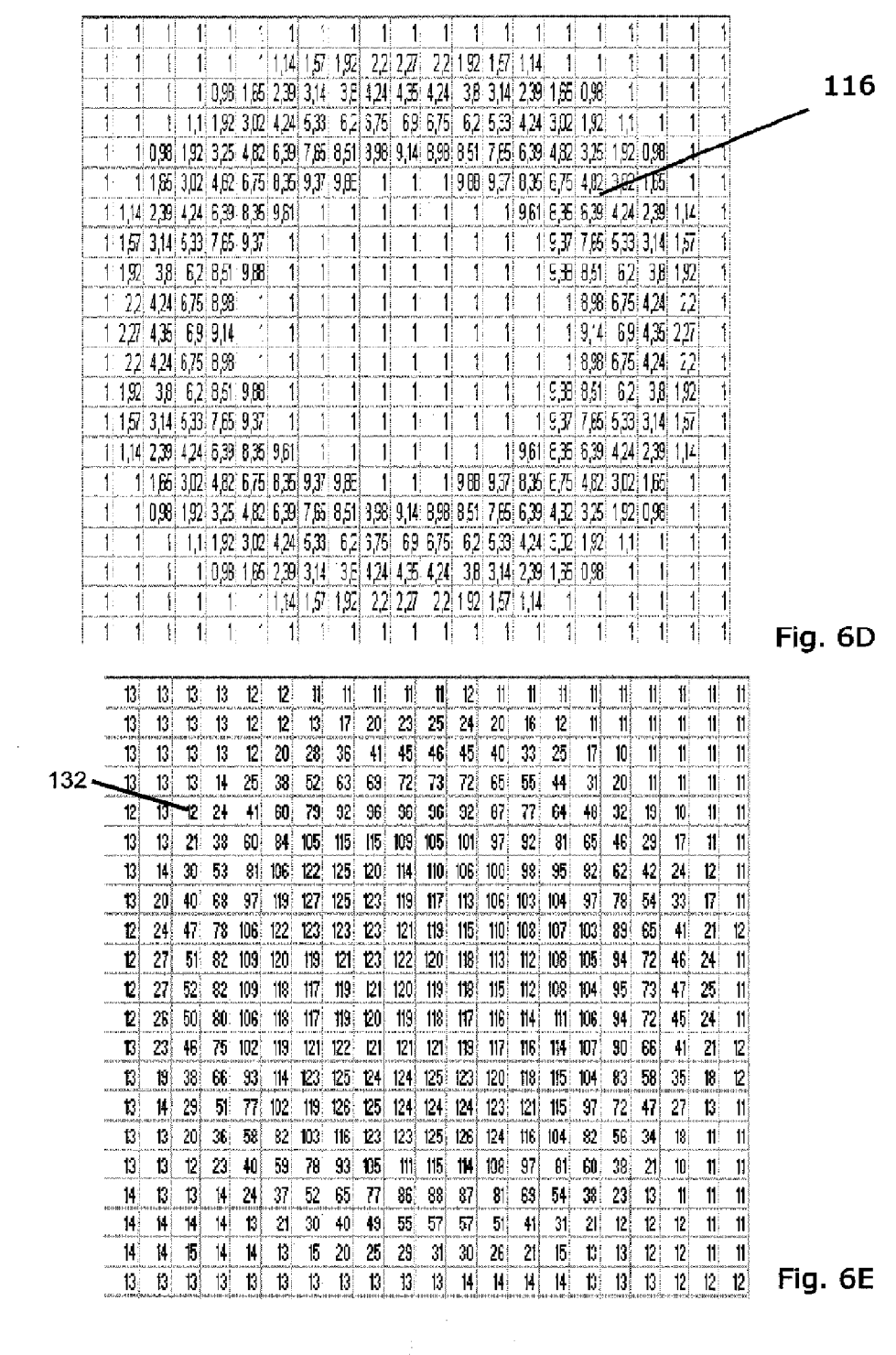

To increase the perceived contrast in the image associated with the ROI image table 112, a virtual image table, such as an enhanced image table 116 shown in FIG. 6D, may be combined with the extracted ROI image table 112 of FIG. 6C. For example, a multiplication table, such as image table 132 of FIG. 6E, may be formed from the tables of FIGS. 6C and 6D as will be understood by those of skill in the art. One of skill in the art will recognize that a variety of different types of modifications may be made to the multiplication table. The image table 132 of FIG. 6E may then be substituted for the extracted ROI image table 112, yielding the image table of FIG. 6F, with modified ROI table 120.

Figure 6F:
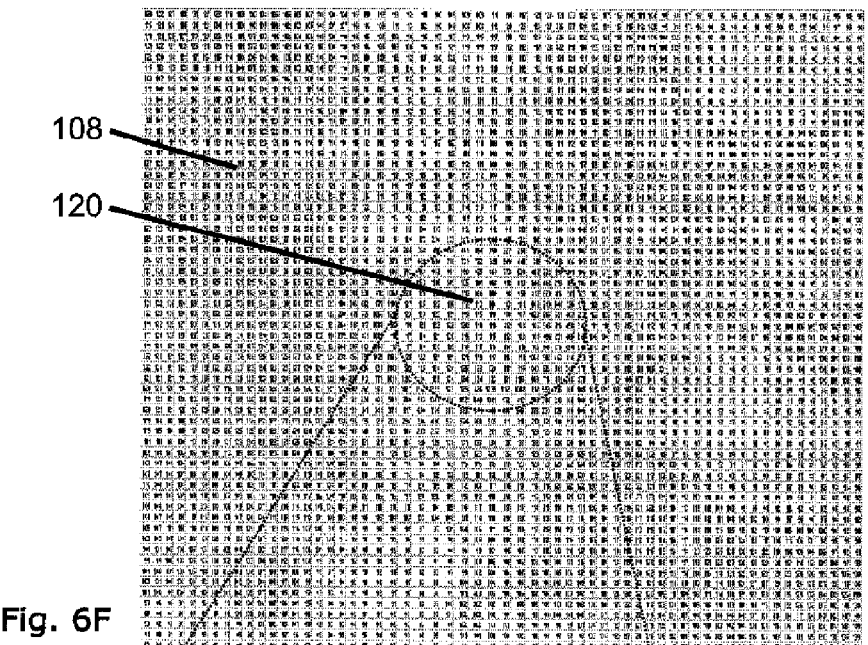
Figure 6G:
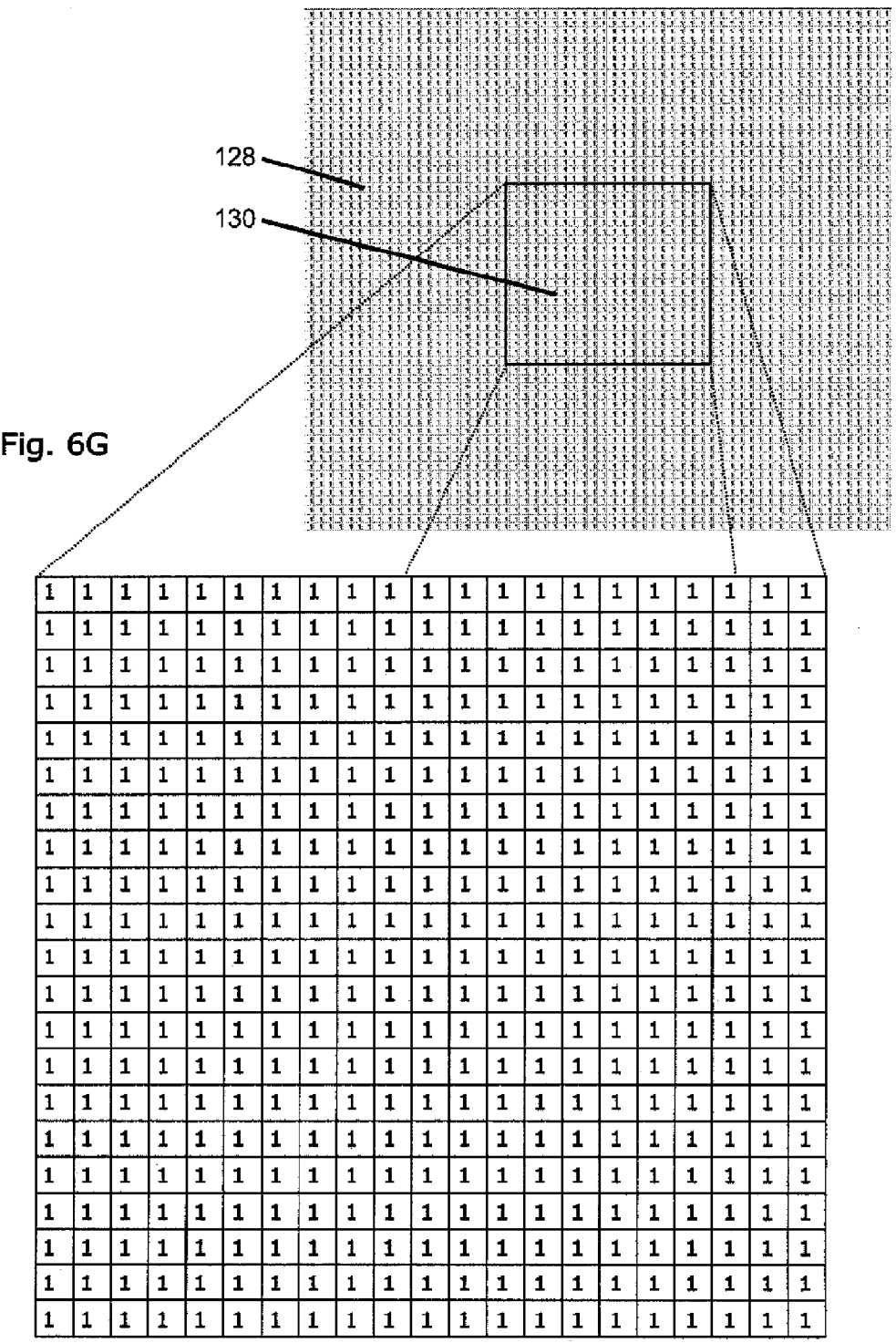
Figure 6H:
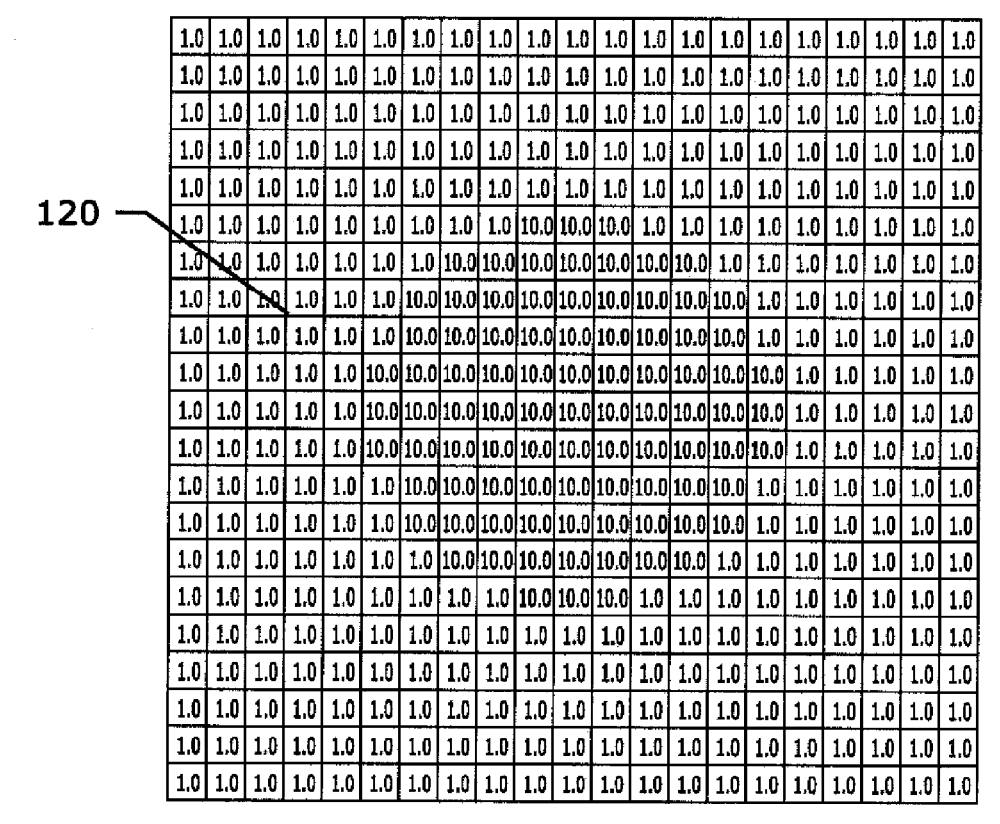
Figure 6I:
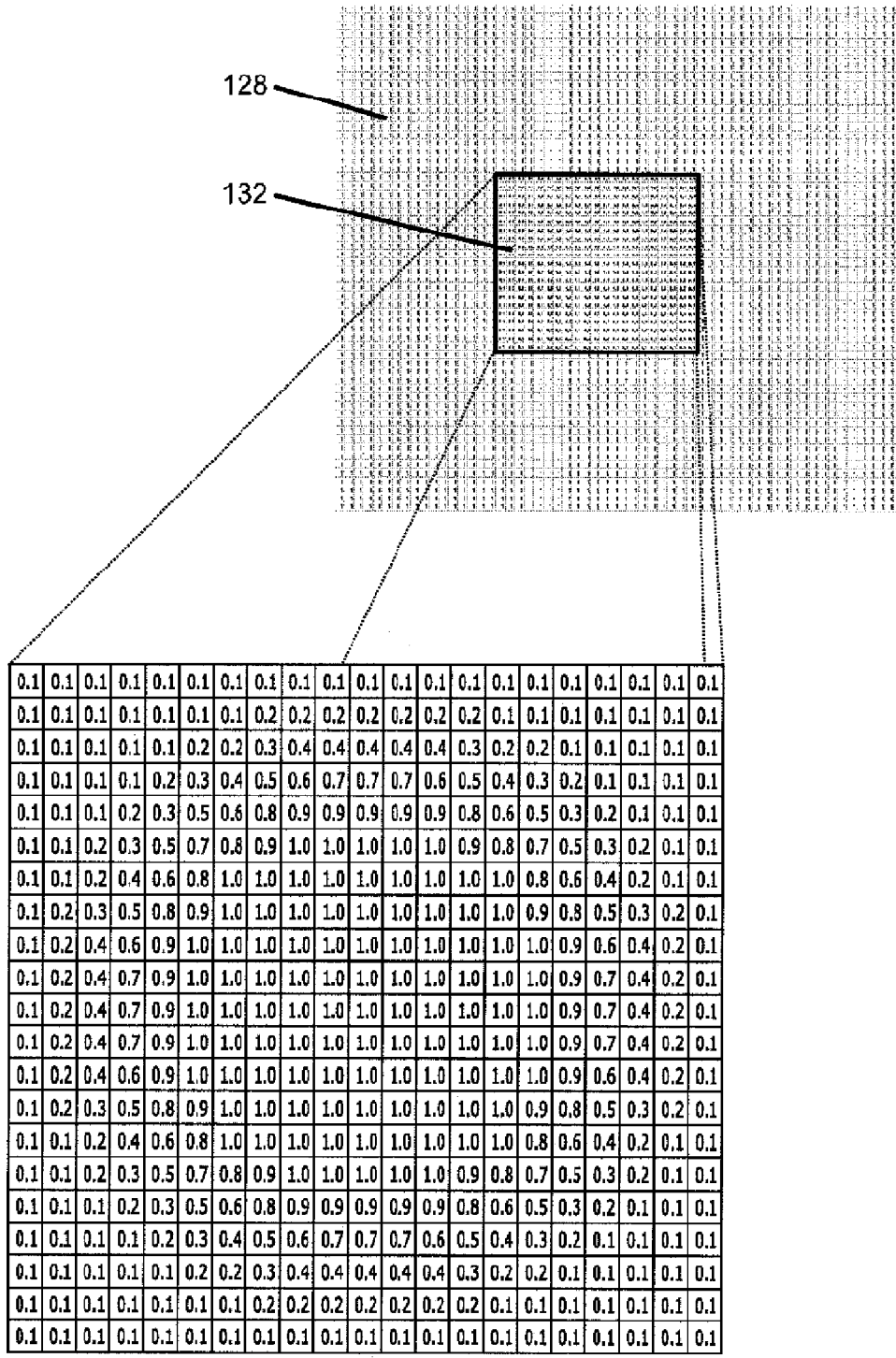

As illustrated in FIGS. 6G-I, the display table may be modified in a hardware aspect of the combination software and hardware implementation. The display layer table 128 contains a ROI display layer table 130 corresponding to the image table ROI 112 of FIG. 6B. The ROI display layer table 128 may be adapted to create the modified ROI display table 120 of FIG. 6H. For example, as shown in FIG. 6H, the modified ROI display table 120 may be modulated to include two levels. The modified ROI display table 120 may then be inserted so as to replace the original ROI display layer table 130, as shown in FIG. 6I, with modified ROI display layer table 132.

As will be understood by one of skill in the art, the specific process illustrated in FIGS. 6A-J is exemplary and only one example of a combination hardware and software solution. For example, one of skill in the art should recognize that information from the original image table may be used without extracting the ROI image table 112, or a duplicate image table may be used to create the enhanced perceived contrast while leaving the original image table unmodified.

Figure 6J:
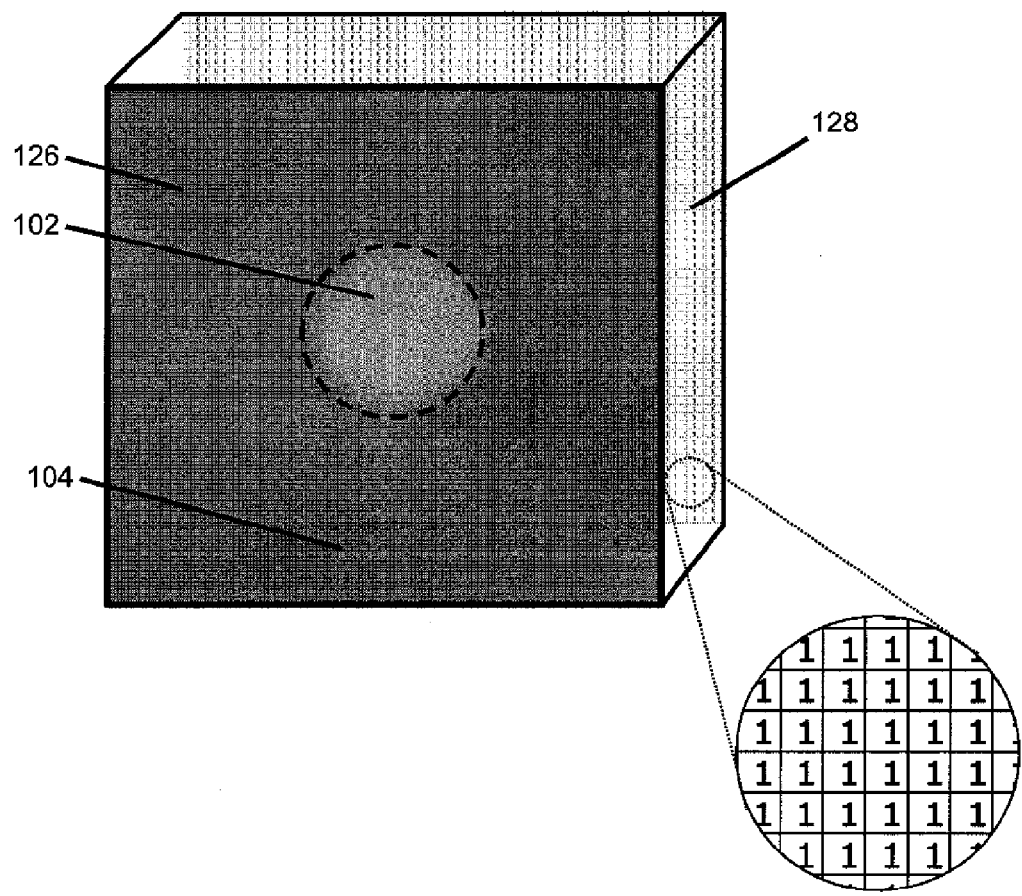

Accordingly, the resulting image 126 in FIG. 6J is the result of the image table 108 with the modified ROI image table 120 of FIG. 6F and the display layer table 128 with the modified backlight ROI table 132 of FIG. 6I.

It will be understood by those of skill in the art that both the software and hardware aspects of the exemplary embodiment may be modified without departing from the scope of the present invention. For example, additional modulation levels may be used to generate the ROI shape and to address limitations due to the number size of LEDs and/or backlights, dithering can used as a transitioning technique, and transitioning can be performed on both the image table and a display table.

It may also be desirable to modify the calibration curves of the display to improve perception. In addition, in the case of a color backlight, the white point may be modified for the backlight corresponding to the ROI.

Figure 7:
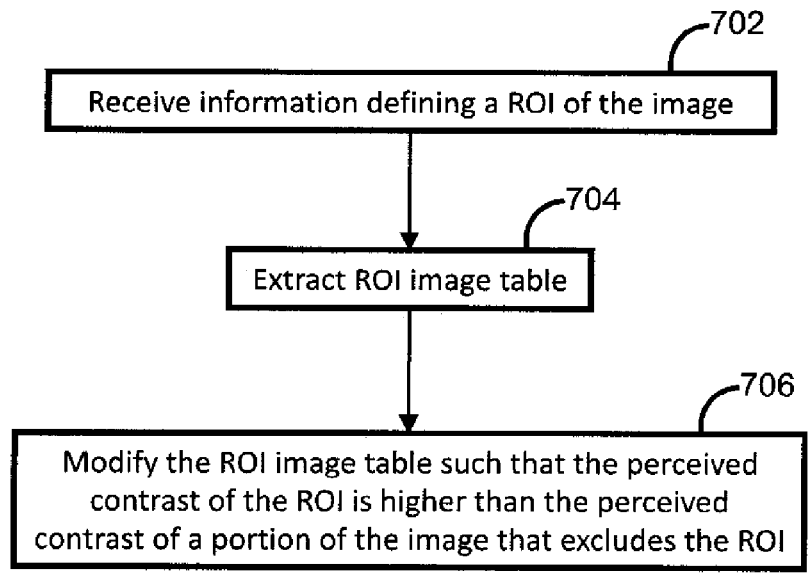
FIG. 7 is a flow chart illustrating a software only method for improving perceived contrast in a region of interest.

Turning next to FIG. 7, provided is a flow chart illustrating an exemplary software only method for improving perceived contrast in a ROI. The process commences at block 702, wherein information defining a ROI of an image being displayed is received. Flow commences to process block 704 wherein a ROI image table is extracted from an image table corresponding to the image being displayed. Progression then continues to process block 706 wherein the ROI image table is modified such that the perceived contrast of the ROI is higher than the perceived contrast of the background. In addition, the luminance of the background may be decreased.

Figure 8:
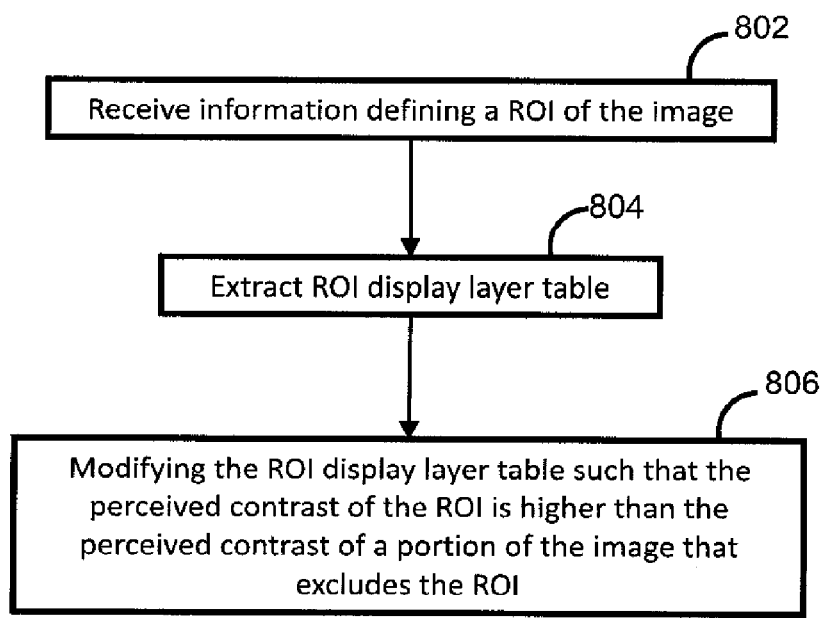
FIG. 8 is a flow chart illustrating a hardware only method for improving perceived contrast in a region of interest.

Turning next to FIG. 8, provided is a flow chart illustrating an exemplary hardware only method for improving perceived contrast in a ROI. The process commences at block 802, wherein information defining a ROI of an image being displayed is received. Flow commences to process block 804 wherein a ROI display layer table is extracted from a display table corresponding to the image being displayed. Progression then continues to process block 806 wherein the ROI display layer table is modified such that the perceived contrast of the ROI is higher than the perceived contrast of the background.

Figure 9:
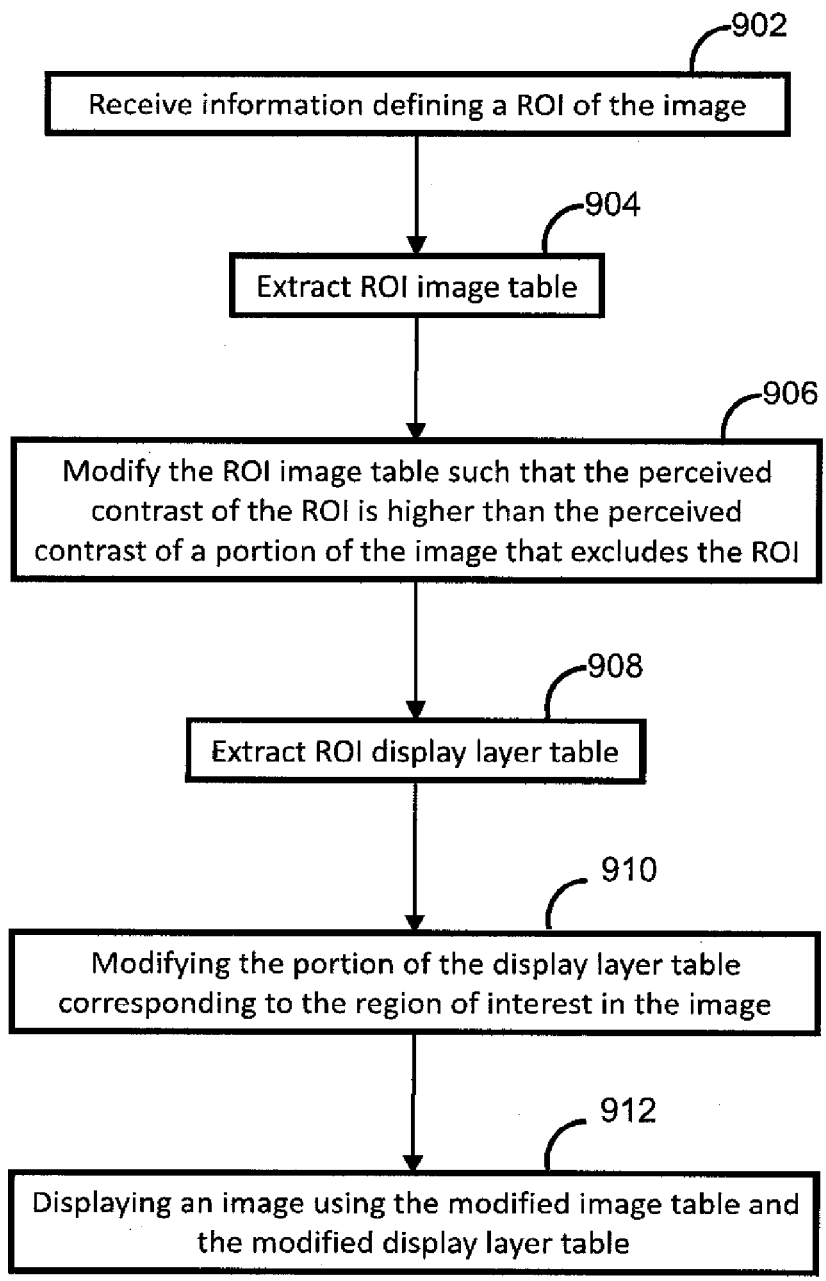
FIG. 9 is a flow chart illustrating a software and hardware method for improving perceived contrast in a region of interest.

Turning next to FIG. 9, provided is a flow chart illustrating an exemplary software and hardware method for improving perceived contrast in a ROI. The process commences at block 902, wherein information defining a ROI of an image being displayed is received. Flow continues to process block 904 wherein a ROI image table is extracted from an image table corresponding to the image being displayed. Progression then continues to process block 906 wherein the ROI image table is modified such that the perceived contrast of the ROI is higher than the perceived contrast of the background. In addition, the luminance of the background may be decreased. Flow then progresses to process block 908 wherein a ROI display layer table is extracted from a display table corresponding to the image being displayed. Progression then continues to process block 910 wherein the ROI display layer table is modified. In one embodiment, it is modified such that it contains two levels. Flow then continues to process block 912 wherein an image is displayed using the modified image table and the modified display table and wherein the displayed image has increased perceived contrast in the ROI as compared to the background.

It may also be desirable to include a secondary ROI within the initial ROI. In this case, the system would permit a user to select a ROI for review. During review, the user may wish to further highlight a certain portion of the ROI. Accordingly, a second ROI within the first ROI may be created such that the perceived contrast in the second ROI is greater than the perceived contrast in the initial ROI, which is greater than the perceived contrast of the background. The second ROI may be created using the same methods set forth in FIGS. 7-9.

It may also be desirable to have multiple ROIs for which perceived contrast is enhanced. The perceived contrast in the additional ROI may be enhanced in the same manner as the first ROI.

In addition, the present invention is particularly applicable to medical displays in which clinicians desire to view subtle features during diagnosis. There are several guidelines that have been developed for calibration of medical displays to help ensure consistency for diagnostic purposes. The American College of Radiology (ACR) and National Electrical Manufacturers Association (NEMA) formed a joint committee to develop a Standard for Digital Imaging and Communications in Medicine (DICOM). In doing so, the committee also developed the Grayscale Standard Display Function ("GSDF"). The DICOM GSDF defines a method for taking the existing Characteristic Curve of a display system (i.e. the Luminance Output in function of each Digital Driving Level ("DDL") or pixel value) and modifying it to the GSDF.

At the heart of the GSDF is the Barten Model, which addresses the perceptivity of the human eye and the adaptation period required for the human eye to adjust to changes in luminance. According to the GSDF, given the black and white levels of the display system, a properly calibrated display should spread out the luminance at each of the intermediary DDLs such as to maximize the Just Noticeable Differences ("JND") between each level. A JND is the luminance difference that a standard human observer can just perceive. Calibration has the aim that each DDL will be as distinguishable as possible from neighboring levels, throughout the luminance range, and it will be consistent with other display systems that are similarly calibrated.

A part of DICOM, supplement 28 ("Digital Imaging and Communications in Medicine (DICOM) Supplement 28: Grayscale Standard Display Function," available at http://medical.nema.org/dicom/final/sup28_ft.pdf) describes the GSDF in more detail, the entirety of which is incorporated herein by reference. The DICOM supplement provides a formula based on human perception of luminance and is also published as a table (going up to 4000 cd/m2). It also uses linear perceptions and JND.

Figure 10:
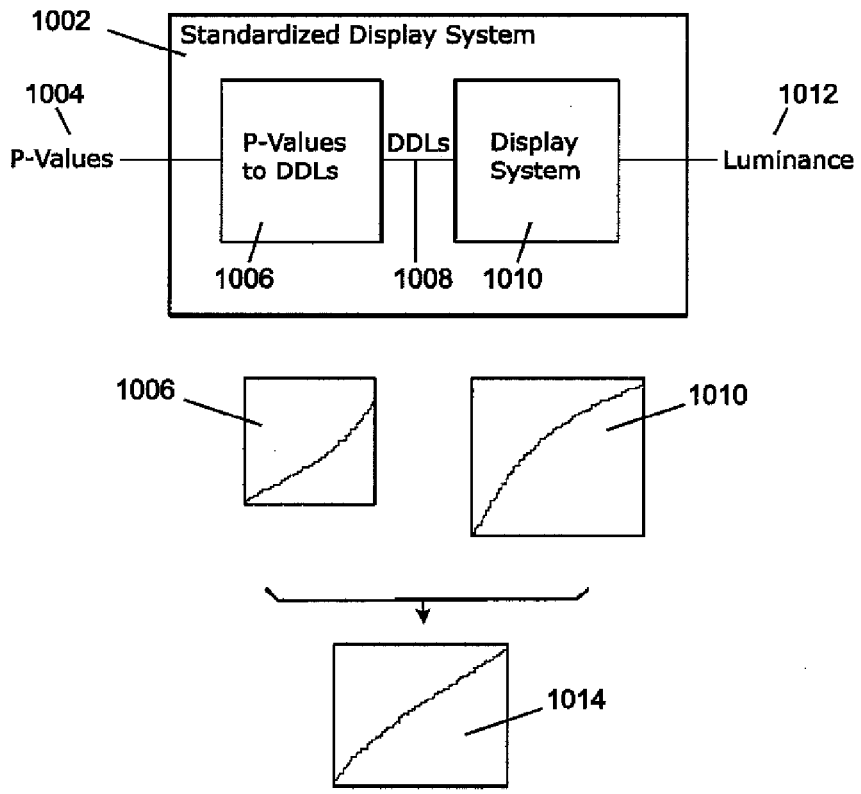
FIG. 10 is a graphical representation of the conceptual model of a conventional standardized display system that matches P-values to Luminance via an intermediate transformation to digital driving levels of a non-standardized display system.
Figure 11:
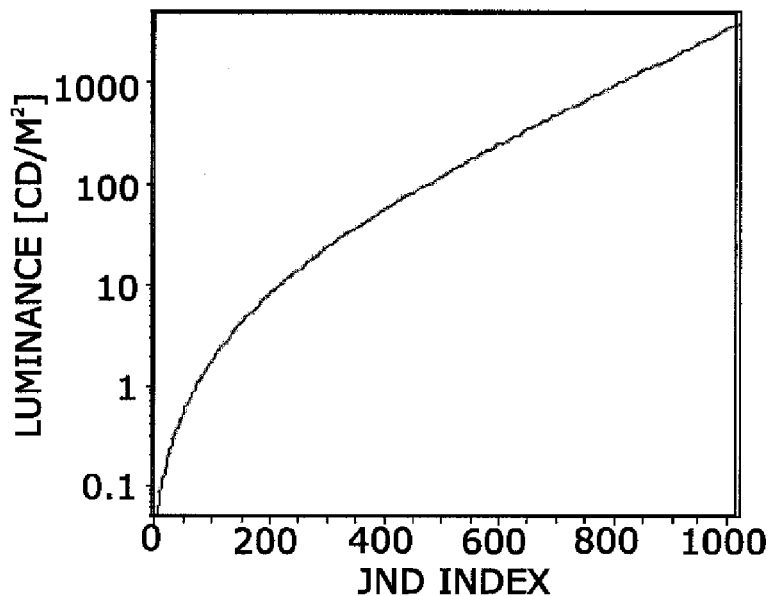
FIG. 11 is a graphical representation of the prior art Grayscale Standard Display Function presented as logarithm of Luminance versus Just Noticeable Difference index.

FIGS. 10 and 11 are extracted from the DICOM supplement 28 document. FIG. 10 shows the principle of changing the global transfer curve of a display system to obtain a standardized display system 1002 according to a standardized grayscale standard display function. In other words, the input-values 1004, referred to as P-values 1004, are converted by means of a "P-values to DDLs" conversion curve 1006 to digital driving values or levels 1008, referred to as DDL 1008, in such a way that, after a subsequent "DDLs to luminance" conversion, the resulting curve "luminance versus P-values" 1014 follows a specific standardized curve. The digital driving levels then are converted by a "DDLs to luminance" conversion curve 1010 specific to the display system (native transfer curve of the display system) and thus allow a certain luminance output 1012. This standardized luminance output curve is shown in FIG. 11, which is a combination of the "P-values to DDLs" conversion curve 1006 and the "DDLs to luminance" curve 1010. This curve is based on the human contrast sensitivity as described by the Barten's model. It is to be noted that it is clearly non-linear within the luminance range of medical displays. The GSDF is defined for the luminance range 0.05 cd/m2 up to 4000 cd/m2. The horizontal axis of FIG. 11 shows the index of the JNDs, referred to as luminance JND, and the vertical axis shows the corresponding luminance values. A luminance JND represents the smallest variation in luminance value that can be perceived at a specific luminance level. A more detailed description can be found in the DICOM supplement 28 document.

A display system that is perfectly calibrated based on the DICOM grayscale standard display function will translate its P-values 1004 into luminance values (cd/m2) 1012 that are located on the GSDF and there will be an equal distance in luminance JND-indices between the individual luminance values 1012 corresponding with P-values 1004. This means that the display system will be perceptually linear: equal differences in P-values 104 will result in the same level of perceptibility at all digital driving-levels 1008. Of course, in practice the calibration is often not perfect due to the fact that typical systems utilize only a discrete number of output luminance values (for instance 1024 specific grayscales).

Figure 12:
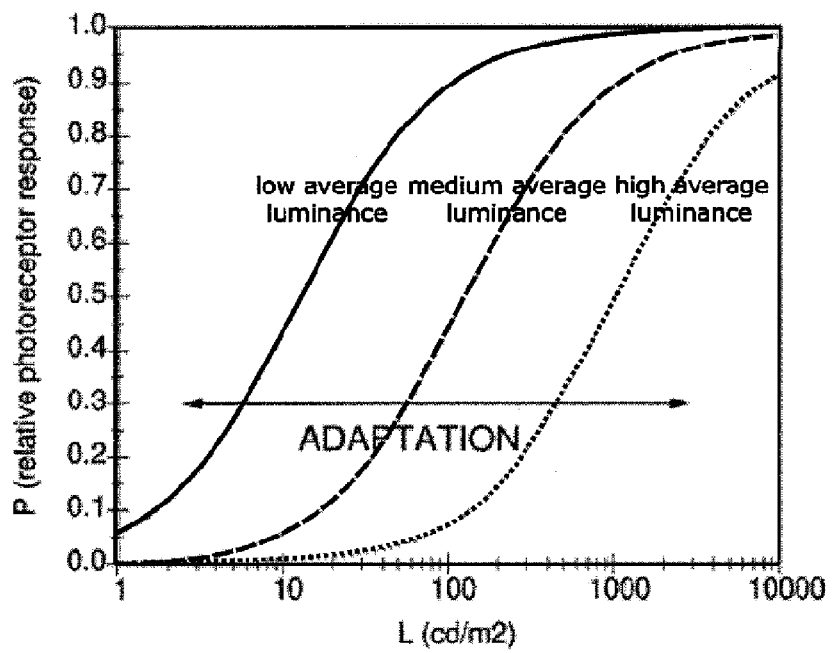
FIG. 12 is a graphical representation of sample retinal response curves at different adapted luminance levels.

FIG. 12 is a graphical representation of sample retinal response curves at different adapted luminance levels. The greater the retinal response, the greater the required adaptation time. This adaptation time can range from seconds (rather small luminance differences) to up to almost minutes in case of very large luminance differences. The present invention is aimed at eliminating the non-productive time that would otherwise result from the retinal adaptation time required to adjust to a change in luminance. Another advantage of eliminating the non-productive time is that following an increase in luminance, the display is operating at a high output level, which tends to cause faster degradation. The less time the display operates at a high luminance, the longer the display is likely to last.

Figure 13:
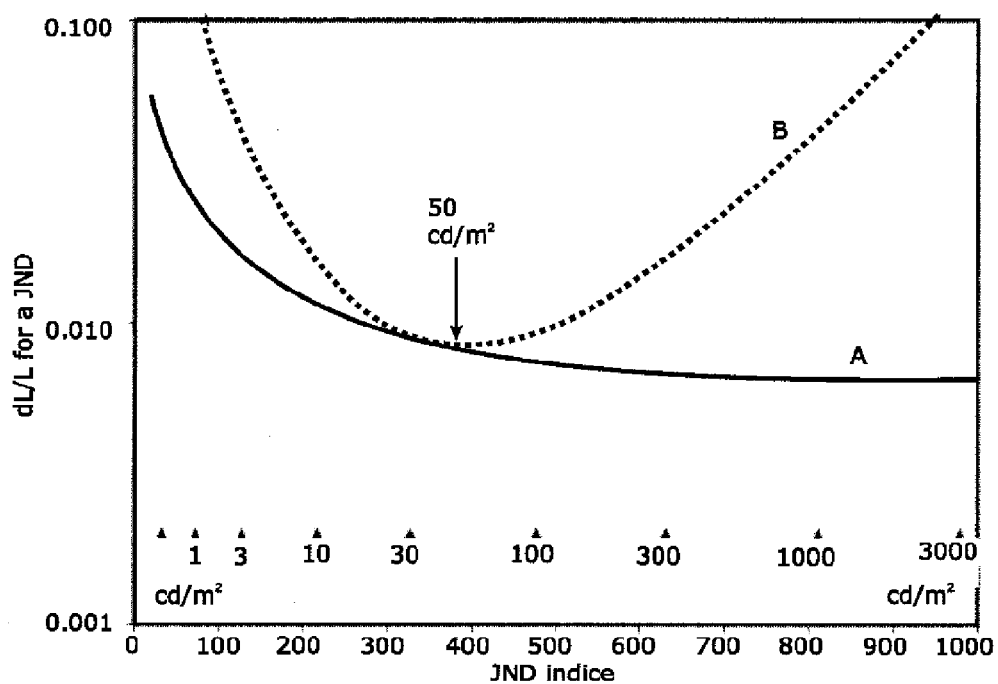
FIG. 13 is a graphical representation of sample contrast thresholds for fixed and variable retinal adaptation.

FIG. 13 is a graphical representation of sample contrast thresholds for fixed and variable retinal adaptation. FIG. 13 illustrates the required contrast difference between consecutive gray levels to be compliant with DICOM GSDF in case of variable adaptation (curve A, the eye is given time to adapt to the current (average) image level) and fixed adaptation (curve B, the eye was adapted to 50 cd/m$^2$ and then suddenly the luminance was increased). The two curves illustrate that if the human eye is not given time to adapt, the difference in luminance between consecutive gray levels must to be increased in order to achieve the same perceived contrast between consecutive gray levels.

When the luminance of the display is stable for a long time, then the eye will be fully adapted and the calibration curve of the display may follow, for example, the normal DICOM GSDF curve, which is represented by curve A of FIG. 13. If, however, the average luminance of the display suddenly changes (such as contemplated by the present invention) the viewer's eye, then the eye will still be adapted to the original luminance. Accordingly, the difference in luminance between consecutive gray levels must to be increased in order to achieve the same perceived contrast between consecutive gray levels. Thus, the calibration curve may be adapted to follow the curve B. The exact curve to be followed at any moment in time should reflect the exact adaptation point of the human eye, which can be calculated based on a human visual system model, or determined by means of experiments as will be understood by those of skill in the art. Thus, at any moment in time the display may still be DICOM compliant in an adapted calibration state.

As the viewer's eye adapts to the change in luminance, for example, from an average luminance of 50 cd/m$^2$ to an average luminance of 200 cd/m2, the actual calibration curve may gradually move from curve B towards curve A. When the eye is fully adapted to the increased luminance, the display may once again be calibrated to the normal DICOM GSDF curve, represented by curve A. Of course, the display may have modified calibration values, such as higher JND values, because GSDF defines calibration in function of absolute luminance values.

The present disclosure describes a method for increasing perceived contrast in a region of interest. Certain solutions for increasing perceived contrast involve increasing luminance in the region of interest. To compensate for the adaptation period of the human eye to the increased luminance, the following methodology and system may be utilized. It may be suitable to perform adaptation only when the user first selects a ROI, but not if the user relocates the ROI, because the user's eye would already be adjusted to the increased luminance in the ROI.

Turning next to FIGS. 14A-J, provided is an example of how the calibration data of a display can be adapted when switching the display from a first luminance setting to a second luminance setting, taking into account that after the switch to the second luminance setting the human eye requires time to adapt to the luminance change. Of course, it will be understood by those of skill in the art that the calibration curves of FIG. 14 are exemplary only and that other curves may be used.

In this specific example, the display may be an OLED display, which is an emissive display, meaning that the luminance emitted by a pixel is dependent to the current that is driven through the pixel. The first luminance setting is such that video level 0 (minimum) corresponds to 1 cd/m$^2$ and video level 255 (maximum) corresponds to 300 cd/m$^2$; and the second luminance setting is such that the that video level 0 (minimum) corresponds to 1 cd/m$^2$ and video level 255 (maximum) corresponds to 2000 cd/m$^2$. Thus, the contrast ratio for the first luminance setting is 300:1 and the contrast ratio for the second luminance setting is 2000:1. For simplicity, this example assumes that the display has been operating at a first luminance setting long enough for human eyes to be perfectly adapted to the average luminance of the display, which may be, for example, 50 cd/m$^2$. Of course, the average luminance of the display may depend on the image contents being displayed.

Figure 14A:
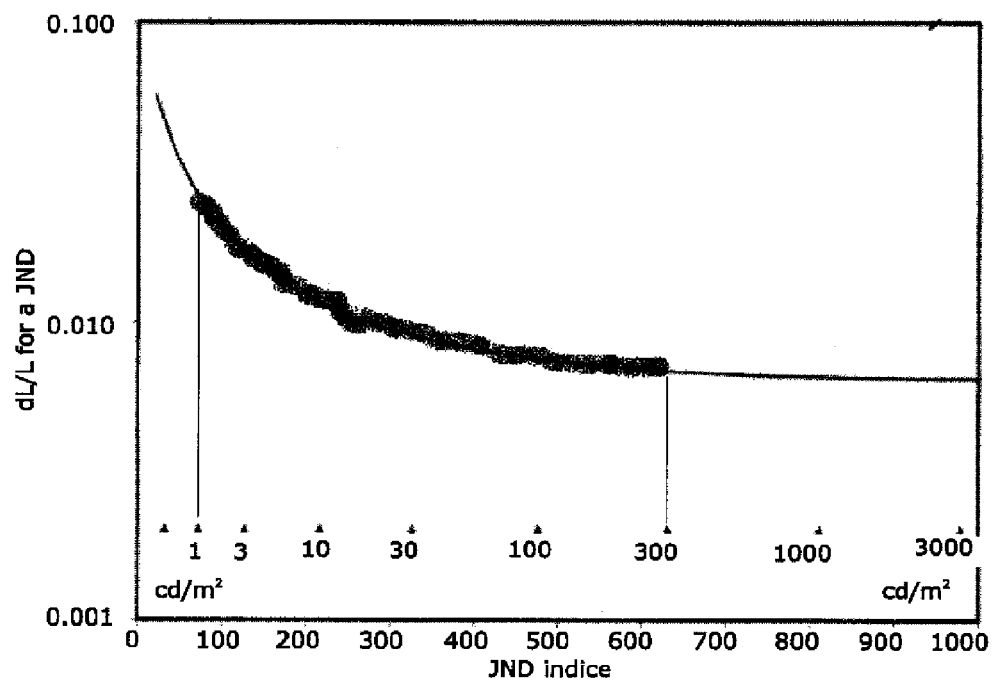
FIGS. 14A-J are exemplary calibration curves according to the invention for a display in which the luminance is increased.
Figure 14B:
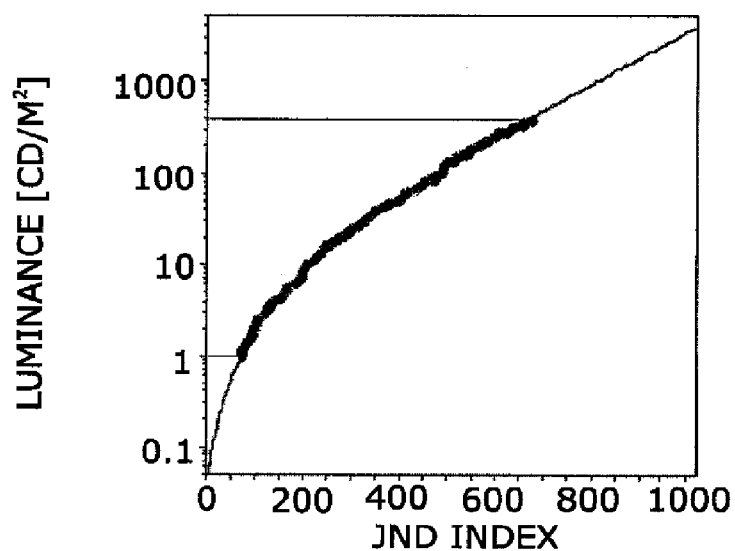

For medical images, for example, typical image contents correspond to average video levels of 15-30%. In a medical environment, it may be preferable if the display complies with the DICOM GSDF standard, which assumes that the eye is perfectly adapted to the luminance of the display. The compliant calibrated display will follow the curves illustrated as FIGS. 14A and 14B, which are two different ways of visualizing the same calibration state of the display. FIGS. 14A and 14B illustrate curves defined by a minimum display luminance level of 1 cd/m$^2$ and a maximum display luminance level of 300 cd/m$^2$).

The system may then receive a request to increase the display from the first luminance setting to a second luminance setting, which may involve, for example, increasing the maximum current through the display pixels such that video level 0 (minimum) corresponds to 1 cd/m$^2$ and video level 255 (maximum) corresponds to 2000 cd/m$^2$, yielding a contrast ratio of 2000:1. The DICOM GSDF standard requires that displays follow a particular luminance curve (the GSDF curve illustrated in FIG. 14C) and the exact part of the curve that needs to be followed depends on the minimum and maximum luminance levels of the display (in this particular example, 1 cd/m$^2$ and 2000 cd/m$^2$). Since these luminance levels have changed, the display instantly after adapting its luminance range may adapt the calibration data such that again in order to compensate for the luminance change so that the display remains compliant with the DICOM GSDF standard.

Figure 14C:
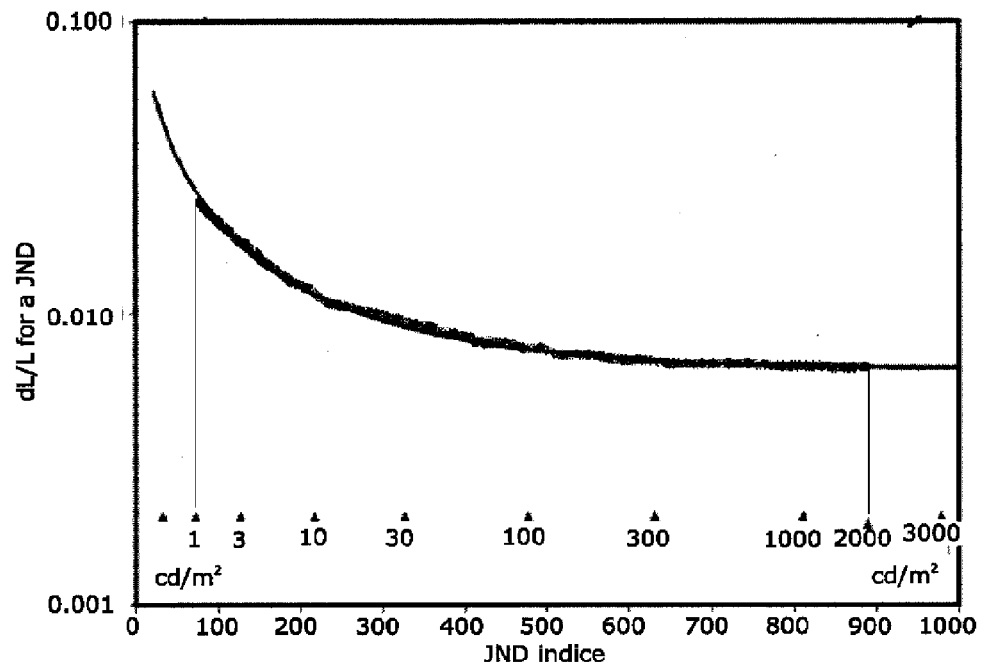
Figure 14D:
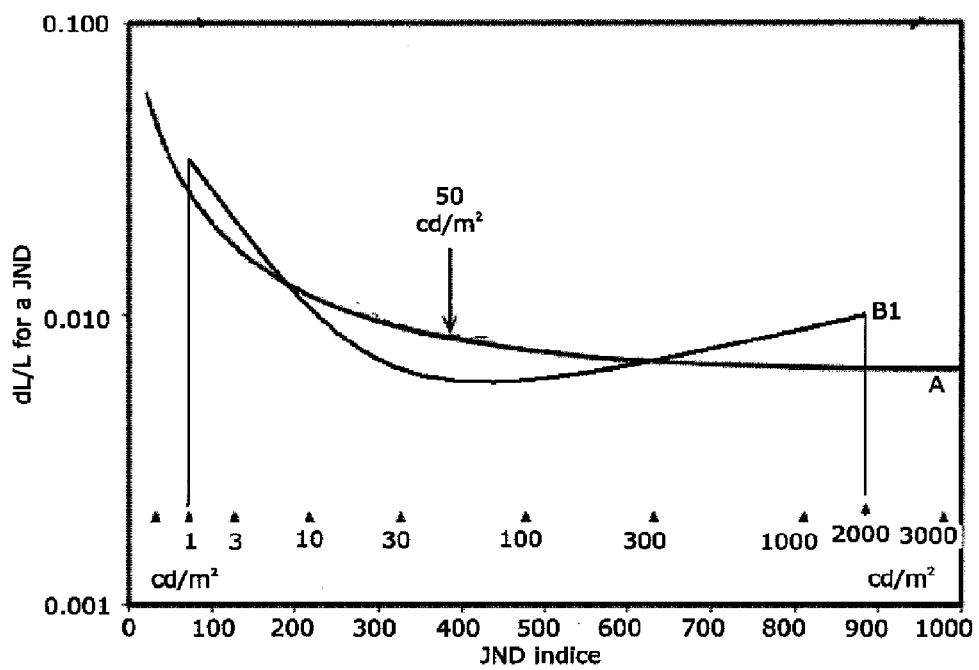
Figure 14E:
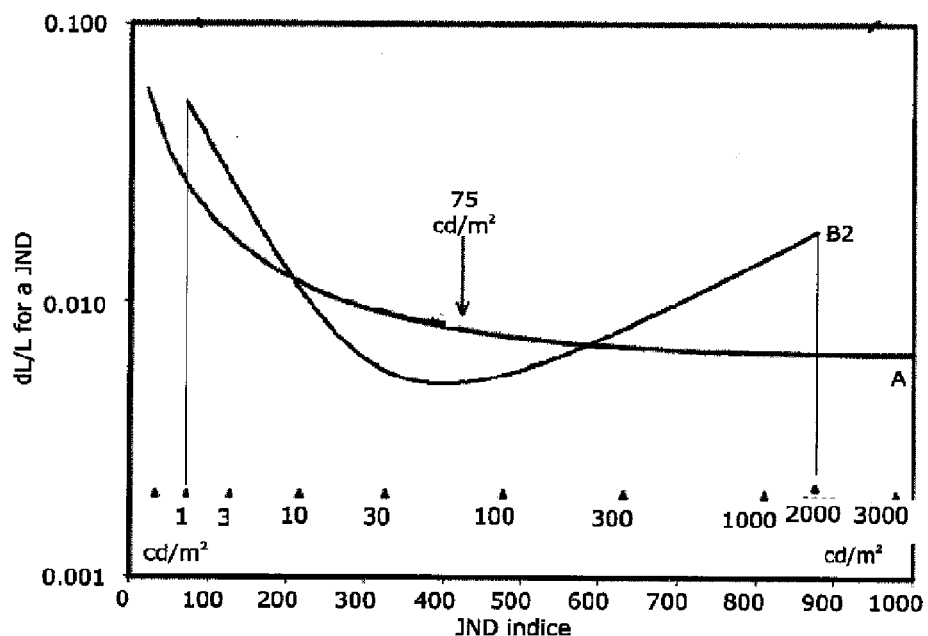
Figure 14F:
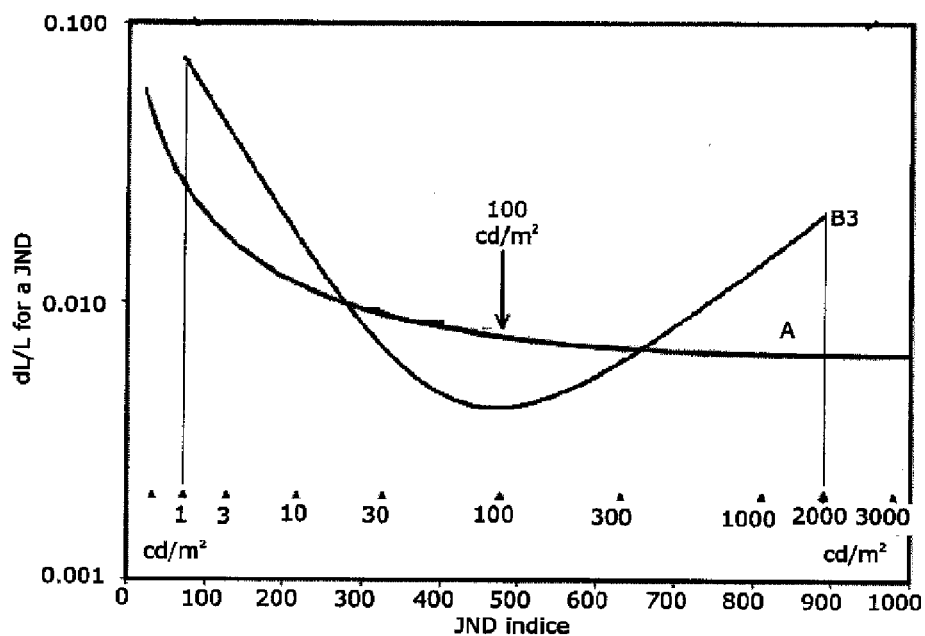
Figure 14G:
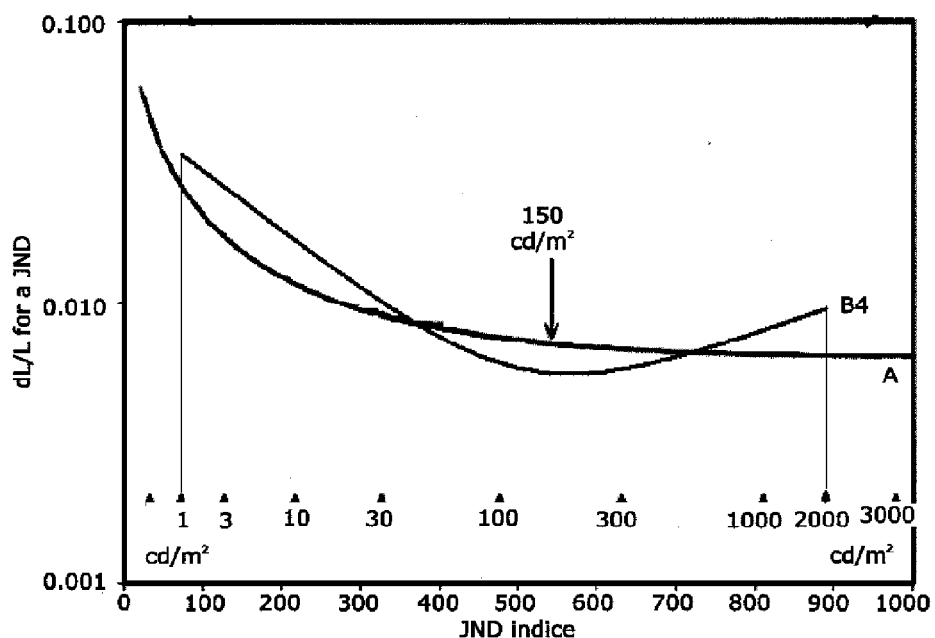
Figure 14H:
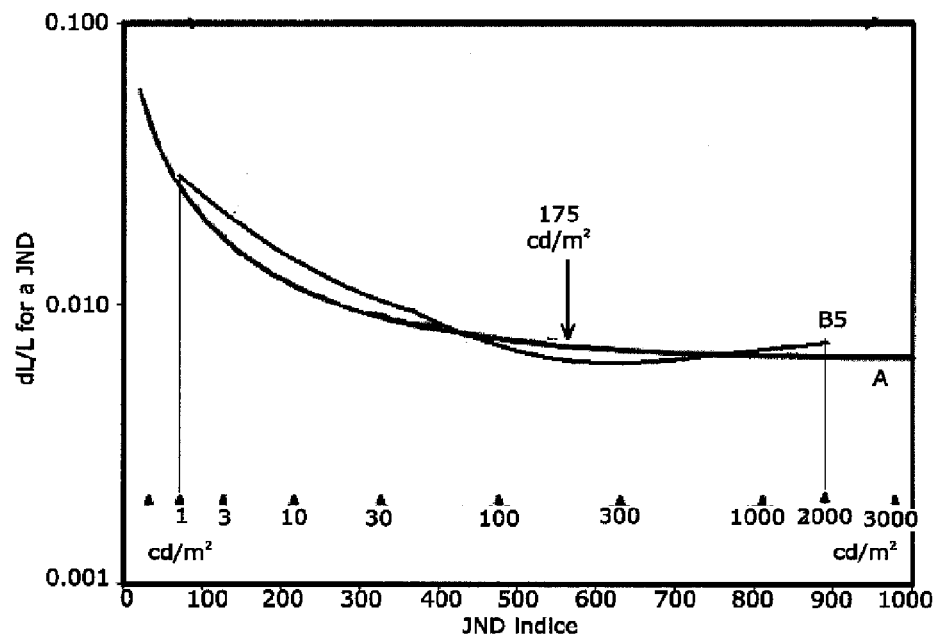

The DICOM GSDF curve of FIG. 14C assumes that the human eye is perfectly adapted immediately to the new boost mode luminance range. In practice this may not be the case, the human eye will require an adaptation period that is dependent on the change in luminance. During the adaptation period the display will not be perceived by the viewer as perceptually uniform (which is the goal of the DICOM GSDF standard). Accordingly, the system may compensate for the fact that the human eye is not yet adapted and modify display parameters so the display is calibrated not to the DICOM GSDF curve of FIG. 14C, but to a modified curve that factors in the human eye's continuous adaptation to the change in the luminance. An exemplary modified calibration curve assuming the eye is adapted at a luminance level of 50 cd/m$^2$ is illustrated in FIG. 14D.

As the eye adapts, the display may adapt its calibration curve to correspond to the adaptation of the eye. For example, FIGS. 14E through 14H illustrate a series of exemplary calibration curves that may match an eye adapted at luminance levels 75 cd/m$^2$, 100 cd/m$^2$, 150 cd/m$^2$, 175 cd/m$^2$, respectively.

Figure 14I:
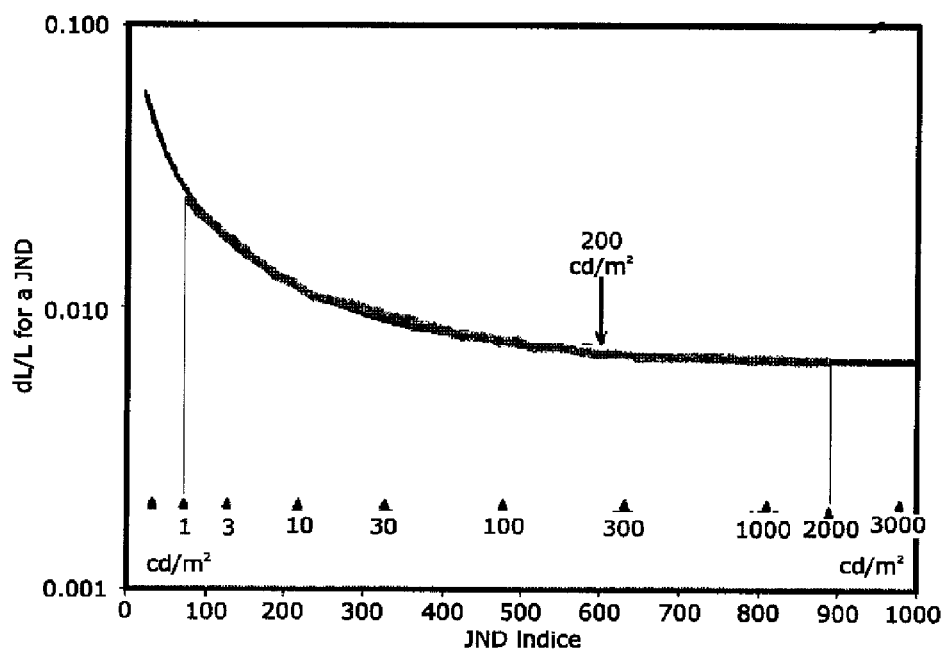
Figure 14J:
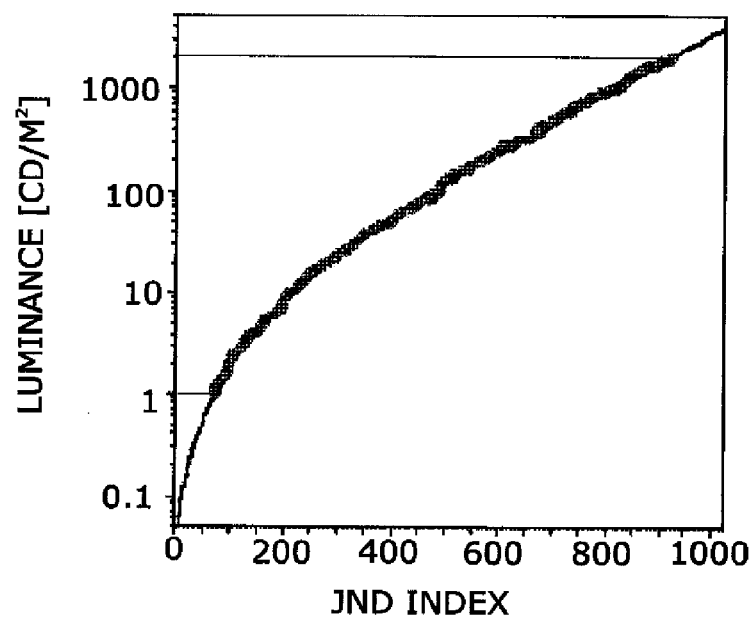

When the eye is (almost) adapted to the new average luminance of the second luminance setting, the display again may have a normal DICOM GSDF calibration curve that corresponds to the second luminance level of the display as illustrated in FIGS. 14I and 14J. Note that in this example the average luminance (averaged over display area) when the display is operating at the second luminance setting is assumed to be 200 cd/m$^2$. It can be seen that the user's eye is adapted to 200 cd/m$^2$ and therefore the calibration data of the display again corresponds to a normal DICOM GSDF curve with minimum luminance 1 cd/m$^2$ and maximum luminance 2000 cd/m$^2$.

When the display moves back from the second luminance setting to the first luminance setting, a similar series of actions may be taken. Thus, the display may continuously update its calibration data such that at any moment in time the calibration of the display reflects the actual adaptation state of the eye of the user. While doing that, again the calibration curve may gradually change from the DICOM GSDF curve that corresponds to second luminance setting, over a series of curves that take into account the fact that the user's eye is not yet adapted to the first luminance setting, and eventually the calibration data from the display will be back at DICOM GSDF curve corresponding to the first luminance setting. The return to the DICOM GSDF curve may occur when the user's eye is adapted (or almost adapted) to the average luminance of the display at the first luminance setting.

Figure 15:
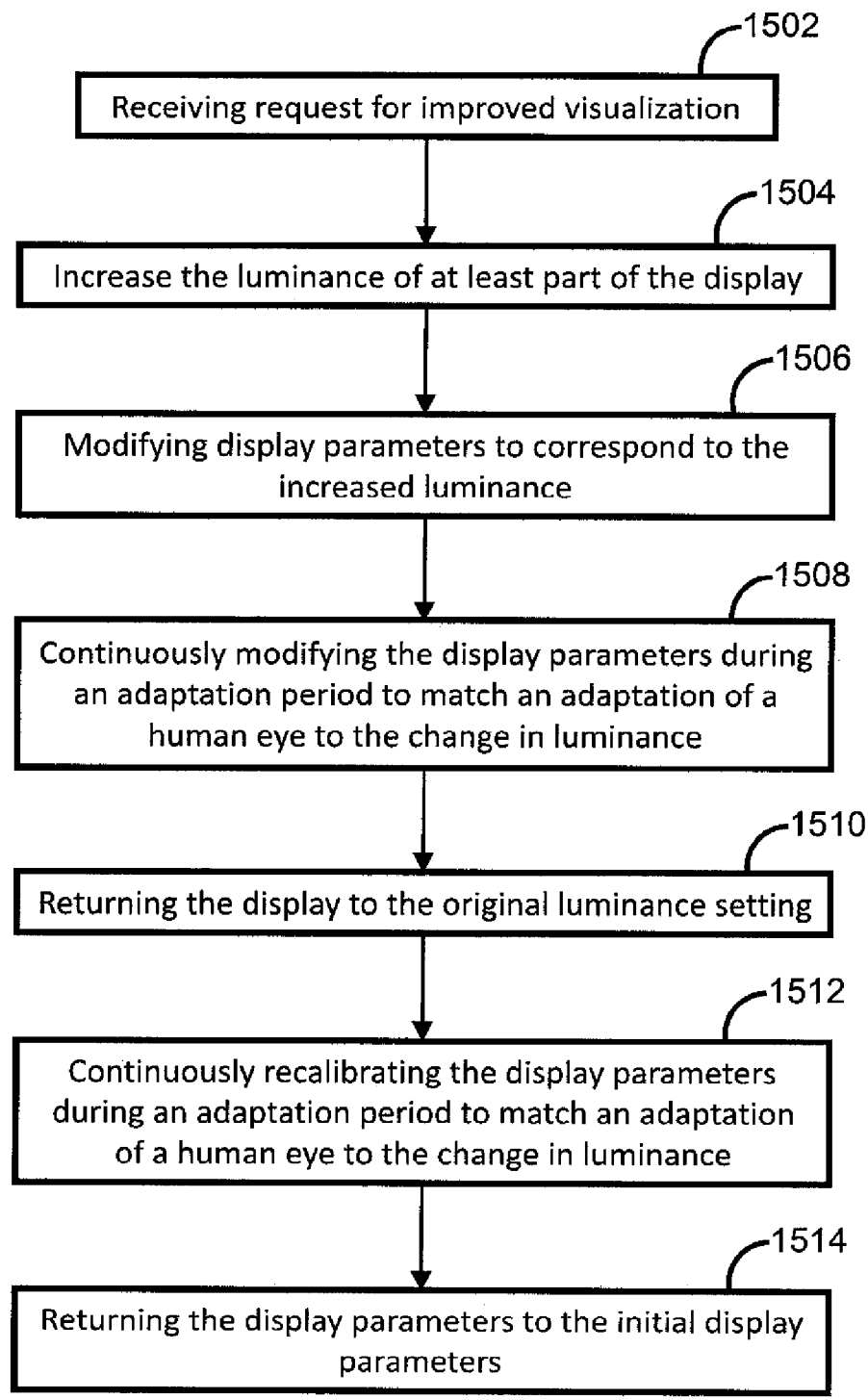
FIG. 15 is a flow chart illustrating a method for modifying the luminance of a display.

Turning next to FIG. 15, a flow chart illustrating a method of changing luminance of a display is provided. Flow commences at process block 1502 wherein a request for improved visualization is received. The request for improved visualization may take any form, and may be a request for increased luminance. For example, the request may originate from a viewer pressing a button on the display. In addition, the request for improved visualization may be received via an on screen display viewer interface or by means of software, e.g., an application program interface call from image viewing software. It will also be understood by those of skill in the art that the request could originate from image processing software, such as software that applies an algorithm to the image and initiates a request for improved visualization based upon finding suspicious features.

Progression then continues to process block 1504 wherein the luminance of at least part of the display is increased from a first luminance setting to a second luminance setting. The second luminance setting may be determined, for example, based on the maximum achievable luminance level of the display, a desired amount of increased detectability, the temperature of display elements prior to increasing the luminance, the ambient light level, the time required for the human eye to adapt to the change in luminance, or combinations thereof.

More specifically, it may be determined that the second luminance setting should provide 10% higher detectability. In such instance, the second luminance setting may be calculated based on the first luminance setting, the ambient light level, and the DICOM GSDF curve. Alternatively, it may be determined that the second luminance setting should achieve maximum detectability. In such case, the display may be driven to maximum luminance, considering that it should not exceed a threshold operating temperature. Alternatively, it may be determined that the second luminance setting should achieve maximum detectability without exceeding a predetermined adaptation time. In such case, the second luminance setting would be selected as the maximum luminance to which the viewer's could adjust within the predetermined adaptation time.

Moreover, it may also be beneficial to maximize the video level of the display prior to increasing the luminance. For example, if the maximum video level of the display is 255 and the display is set to a lower level, such as 199, at the time the request for improved visualization is received, the video level may be increased (e.g., by way of contrast enhancement and adjusting other display parameters as will be understood by those skilled in the art) prior to increasing the luminance of the display. Thus, if a display shows an image that does not make use of the entire dynamic range that the display offers (e.g., the image sent to the display panel only contains gray levels 54 up to 220) then the image data can be modified such that the entire dynamic range of the display is used. This further improves visualization of the image.

Alternatively, the contrast enhancement may modify the image data such that the lowest video level in the image does not alter (e.g., it stays video level 54) but that all other levels are rescaled such that the highest video level becomes the maximum video level that the display can handle (e.g., level 220 is mapped onto level 255 in case of an 8 bit display, and all original video levels with range 54-220 are mapped onto the range 54-255). The example given is only illustrative and the person skilled in the art will understand that various types of contrast enhancement, histogram mapping and gamut mapping algorithms can be used. In an alternative implementation, the modification of the image contents could also be done gradually instead of instantly in order to facilitate adaptation of the human eye. Moreover, both techniques may be combined. Thus it is possible and may be desirable to concurrently apply modification of the image data (to maximally make use of the available dynamic range of the display) while increasing the luminance and adapting corresponding display parameters (e.g., to ensure that the display remains DICOM GSDF compliant).

Flow then continues to process block 1506 wherein additional display parameters are modified to correspond to the increase in luminance from the first luminance setting to the second luminance setting. Progression then continues to process block 1508 wherein display parameters are continuously modified during an adaptation period to match an adaptation of a human eye to the change in luminance.

In one embodiment, the display settings are DICOM GSDF compliant at the first luminance setting, at the second luminance setting and during the adaptation period. In another embodiment, the display settings are adapted for a color display wherein modification during the adaptation period (e.g., color adaptation, color calibration, etc.) improves the viewer's perception of color images. Moreover, the display settings curve can be calculated based on a human visual system model, or determined by means of experiment.

It will also be understood by those skilled in the art that the present discussion references the grayscale DICOM GSDF standard, the invention is equally applicable to displays outputting color images. In such instances, the display parameters may be modified as known in the art to maintain proper color settings, as opposed to the grayscale and contrast display parameters discussed with reference to the DICOM GSDF standard.

The processes by which the display parameters may be modified to correspond to a change in luminance or the adaptation of the viewer's eyes are known in the art. Similarly, calculating the viewer's adaptation to a change in display parameters, such as luminance, is known in the art. For example, the adjustment model may take the form of LUTs, algorithms, or other models known to those skilled in the art. In addition, the modification of display parameters may occur at the refresh rate of the display to minimize visual artifacts. Discussions of such processes can be found in U.S. Publication No. 2010/0053222 entitled, "Methods and Systems for Display Source Light Management with Rate Change Control," filed Aug. 30, 2008; U.S. Publication No. 2006/0001641 entitled, "Method and Apparatus to Synchronize Backlight Intensity Changes with Image Luminance Changes," filed Jun. 30, 2004; U.S. Publication No. 2007/0067124 entitled, "Method and Device for Improved Display Standard Conformance," filed Jul. 28, 2006; U.S. Pat. No. 7,639,849 entitled, "Methods, Apparatus and Devices for Noise Reduction," filed May 23, 2005, the entirety of each of which is incorporated by reference herein.

In one embodiment, the display remains at the second luminance setting for a time period that may be defined, for example, from the point at which the luminance was originally increased, or from the point at which the human eye is fully adapted to the change in luminance. In addition, the system may also be capable of receiving a request (e.g., automated through software or initiated by the viewer) to maintain the display at the second luminance setting. Thus, a viewer of the display may be able to control the duration of operation at the second luminance. During operation at the second display setting, the system may also monitor the temperature of the backlight(s) and automatically return the display to the first luminance setting if the temperature exceeds an acceptable level.

In addition, the method of the present invention can be combined with other calibration/stabilization technology, such as ambient light compensation systems and methods. One such system is Barco Healthcare's I-Guard system. Thus, the ambient light compensation system may measure in real-time achieved luminance and (slightly) adapt the backlight driving value to maintain stable achieved luminance.

Progression then continues to process block 1510 wherein the luminance is returned to the original luminance setting. The display parameters may be modified to correspond to the change. Flow then continues to process block 1512 wherein display parameters are continuously modified during an adaptation period to match an adaptation of a human eye to the change in luminance from the second luminance setting to the first luminance setting. Flow then progresses to process block 1514 wherein the display parameters match those of the initial display parameters prior to the change in luminance.

In one embodiment, the display is capable of more than two luminance settings. Thus, when the display is operating at the second luminance level, it may be capable of receiving an additional request for improved visualization. As will be understood by those skilled in the art, the process of adjusting the luminance and display parameters could then be repeated to change the luminance to a third setting that is higher than the second setting. In such instance the display would then eventually return from the third luminance setting to the first luminance setting.

Accordingly, methods for changing luminance of the display may be combined with the method increasing perceived contrast described herein.

Figure 16:
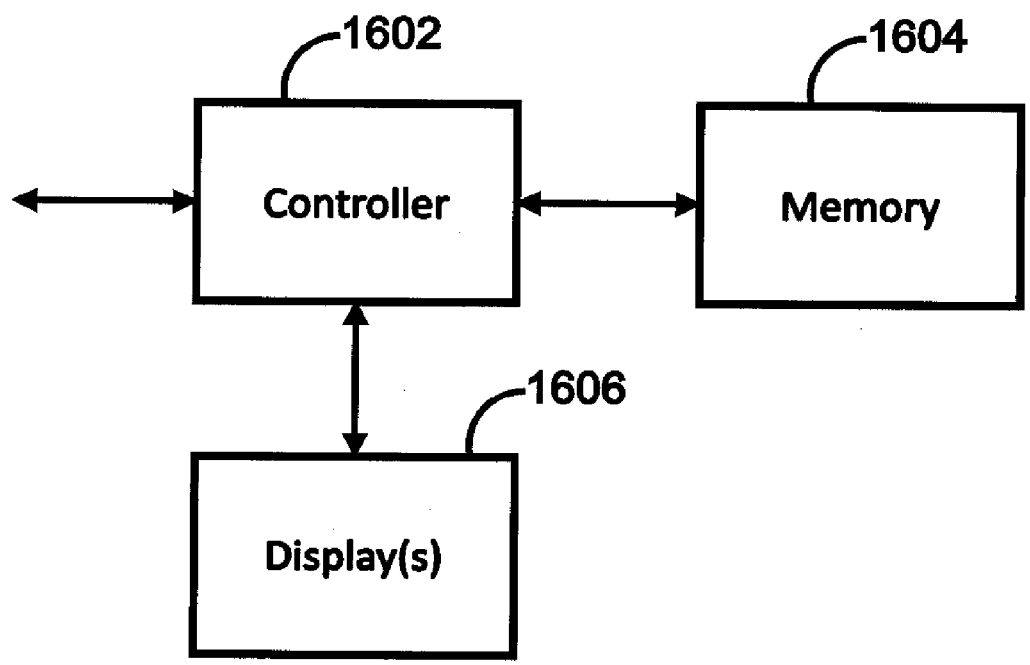
FIG. 16 is a block diagram illustrating a system according to the invention.

Turning next to FIG. 16, provided is a block diagram of a display system according to the invention. In its simplest form, the system includes a controller 1602, memory 1604 and one or more displays 1606. The controller 1602 may be configured to perform each of the functions identified in process blocks 1502, 1504, 1506, 1508, 1510, 1512 and 1514. The controller 1602 may also be configured to perform each of the steps of FIGS. 7-9. In doing so, the controller may access and store information, such as LUTs or data used for or derived from algorithms, in memory 1604. The controller 1602 may further cause the display 1606 to operate using different display parameters or using various combinations of driving the light sources in the backlight of the display.

It will be understood by those of skill in the art that the controller 1602 may be any type of control circuit implemented as one or combinations of the following: as a hard-wired circuit; programmable circuit, integrated circuit, memory and i/o circuits, an application specific integrated circuit, application-specific standard product, microcontroller, complex programmable logic device, field programmable gate arrays, other programmable circuits, or the like. The memory 1604 may be any type of storage as will be understood by those of skill in the art. Additionally, the display(s) 1606 may be any type of display. Preferably, the display 1606 is suitable for use as a medical diagnostic display.

In addition the functions and methodology described herein may be implemented in part or in whole as a firmware program loaded into non-volatile storage (for example, an array of storage elements such as flash RAM or ferroelectric memory) or a software program loaded from or into a data storage medium (for example, an array of storage elements such as a semiconductor or ferroelectric memory, or a magnetic or optical medium such as a disk) as machine-readable code, such code being instructions executable by an array of logic elements such as a microprocessor, embedded microcontroller, or other digital signal processing unit. Embodiments also include computer program products for executing any of the methods disclosed herein, and transmission of such a product over a communications network (e.g. a local area network, a wide area network, or the Internet). Thus, the present invention is not intended to be limited to the embodiments shown above but rather is to be accorded the widest scope consistent with the principles and novel features disclosed in any fashion herein.

In addition, while the present invention describes various mechanisms for increasing perceived contrast, it should be understood by those of skill in the art that the source image file being viewed on the display is never modified. This feature may be particularly useful when the images being examined are patient scans and where it would be undesirable to modify patient records.

It will be understood by those skilled in the art that the present invention, while primarily described in terms of medical displays, is applicable to other types of displays as well. For example, the methods and systems described herein may be particularly useful for satellite imaging. Satellite imaging data may have a very large dynamic range (e.g., 11+ bits). Causing a satellite imaging display to operate at a second increased luminance setting may be useful to assist the viewer in resolving detail in the display images.

Although the invention has been shown and described with respect to a certain preferred embodiment or embodiments, it is obvious that equivalent alterations and modifications will occur to others skilled in the art upon the reading and understanding of this specification and the drawings. In particular, in regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent). In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for improving the visualization of a 3D region of interest of an image on a display comprising:
   receiving information defining a 3D region of interest of the image, the 3D region of interest being a portion of the image; and
   increasing the perceived contrast of the 3D region of interest with respect to at least a portion of the image adjacent the 3D region of interest;
   wherein modifying the information corresponding to information contained in an image table comprises combining a 3D region of interest table with a virtual image table.

2. The method of claim 1, wherein the image is perceived as three dimensional by the human visual system.

3. The method of claim 1, wherein the display is a 2D or a 3D display.

4. The method of claim 1, wherein the 3D region of interest is non-spherical.

5. The method of claim 1, further comprising transitioning between the 3D region of interest and the portion of the image adjacent the 3D region of interest or the portion of the image that excludes the 3D region of interest.

6. The method of claim 1, wherein the 3D region of interest table and the virtual image table are multiplied.

7. The method of claim 1, wherein a portion of the image table corresponding to the 3D region of interest is modified such that the perceived contrast of the 3D region of interest is increased.

8. The method of claim 1, wherein a portion of the image table corresponding to the portion of the image that excludes the 3D region of interest is modified such that the perceived contrast of the portion of the image that excludes the 3D region of interest is decreased.

9. The method of claim 1, further comprising receiving information defining a second 3D region of interest within the 3D region of interest and increasing the perceived contrast of the second 3D region of interest with respect to the portion of the 3D region of interest adjacent the second 3D region of interest.

10. A method for improving visualization of a 3D region of interest of an image on a n-layer display comprising:
    receiving information defining a 3D region of interest of the image, the 3D region of interest being a portion of the image;
    determining the portion of an image table corresponding to the 3D region of interest; and
    modifying information corresponding to information contained in the image table and/or the driving levels of one or more layers of the n-layer display such that the perceived contrast of the region of interest is higher than the perceived contrast of a portion of the image that excludes the 3D region of interest;
    wherein modifying the information corresponding to the information contained in the image table comprises combining a 3D region of interest table with a virtual image table.

11. A method for improving visualization of a 3D region of interest of an image on a n-layer display comprising:
    receiving information defining a 3D region of interest of the image, the region of interest being a portion of the image;
    determining the portion of the an image table corresponding to the 3D region of interest; and
    modifying information corresponding to information contained in the image table and/or the driving levels of one or more layers of the n-layer display such that the perceived contrast of the region of interest is higher than the perceived contrast of a portion of the image that excludes the 3D region of interest, wherein:
    the n layer display is a 2D or a 3D display;
    the 2D or 3D n layer display is caused to operate at an increased luminance inside a 3D region of interest; and
    calibration parameters of the 2D or 3D n layer display are continuously adapted such that the display complies to a standard when the display operates at an initial luminance setting, while the display is gradually transitioning from the luminance setting to the increased luminance setting, and while the display operates at the increased luminance setting.

12. The method of claim 11, wherein:
    information defining multiple 3D regions of interest is received;
    image tables corresponding to the 3D regions of interest are determined; and
    information corresponding to information contained in the image tables and/or the driving levels of one or more layers of the n-layer display is modified such that the perceived contrast of the 3D regions of interest is higher than the perceived contrast of a portion of the image that excludes the 3D region of interest.

13. The method of claim 11, wherein the luminance of light is increased in the portion of the 2D and/or 3D n layer display corresponding to the 3D region of interest such that the perceived contrast of the 3D region of interest is increased.

14. The method of claim 11, wherein the n-layer display is a single layer display.

15. A method of claim 11, wherein the 2D or 3D n layer display parameters are modified to correspond to the increased luminance such that the perceived contrast between adjacent levels at the increased luminance setting is greater than the perceived contrast between adjacent levels at the initial luminance setting, and wherein the display parameters are continuously modified during an adaptation period of the luminance increase to match an adaptation of a human eye to the change in luminance from the initial luminance setting to the increased luminance setting.

16. The method of claim 11, wherein the 2D or 3D n layer display settings are DICOM GSDF compliant at the initial luminance setting, at the increased luminance setting and during the adaptation period.

17. A display system comprising:
    a display;
    an image processing controller communicably coupled to the display; and memory communicably coupled to the image processing controller;

wherein the image processing controller is configured to operate the display in accordance with the method of claim 1.

18. A display system comprising:
an n-layer display;
an image processing controller communicably coupled to the display; and
memory communicably coupled to the image processing controller;
wherein the image processing controller is configured to:
receive information defining a 3D region of interest of the image, the 3D region of interest being a portion of the image;
determine the portion of an image table corresponding to the 3D region of interest; and
modify information corresponding to information contained in the image table and/or the driving levels of one or more layers of the n-layer display such that the perceived contrast of the 3D region of interest is higher than the perceived contrast of a portion of the image that excludes the 3D region of interest;
wherein the image processing controller is further configured to modify the at least one 3D region of interest table to combine the 3D region of interest table with a virtual image table.

19. The system of claim 18, wherein the image is perceived as three dimensional by the human visual system.

20. The system of claim 18, wherein the display is a 2D or a 3D display.

21. The system of claim 18, wherein the n-layer display is a single layer display.

22. The system of claim 18, wherein:
information defining multiple 3D regions of interest is received;
image tables corresponding to the 3D regions of interest are determined; and
information corresponding to information contained in the image table and/or the driving levels of one or more layers of the n-layer display is modified such that the perceived contrast of the 3D regions of interest is higher than the perceived contrast of a portion of the image that excludes the 3D region of interest.

23. The system of claim 18, wherein the 3D region of interest is non-spherical.

24. The system of claim 18, wherein the n-layer display is a single layer display.

25. The system of claim 18, wherein the image processing controller is further configured to multiply the 3D region of interest table and the virtual image table.

26. The method of claim 10, wherein the n-layer display is a single layer display.

27. The method of claim 10, wherein:
information defining multiple 3D regions of interest is received;
image tables corresponding to the 3D regions of interest are determined; and
information corresponding to information contained in the image tables and/or the driving levels of one or more layers of the n-layer display is modified such that the perceived contrast of the 3D regions of interest is higher than the perceived contrast of a portion of the image that excludes the 3D region of interest.

28. The method of claim 10, wherein the luminance of light is increased in the portion of the 2D and/or 3D n layer display corresponding to the 3D region of interest such that the perceived contrast of the 3D region of interest is increased.

29. The method of claim 10, wherein:
the n layer display is a 2D or a 3D display; and
the 2D or 3D n layer display is caused to operate at an increased luminance inside a 3D region of interest.

30. The method of claim 29, wherein calibration parameters of the 2D or 3D n layer display are continuously adapted such that the display complies to a standard when the display operates at an initial luminance setting, while the display is gradually transitioning from the luminance setting to the increased luminance setting, and while the display operates at the increased luminance setting.

31. A method of claim 29, wherein the 2D or 3D n layer display parameters are modified to correspond to the increased luminance such that the perceived contrast between adjacent levels at the increased luminance setting is greater than the perceived contrast between adjacent levels at the initial luminance setting, and wherein the display parameters are continuously modified during an adaptation period of the luminance increase to match an adaptation of a human eye to the change in luminance from the initial luminance setting to the increased luminance setting.

32. The method of claim 30, wherein the 2D or 3D n layer display settings are DICOM GSDF compliant at the initial luminance setting, at the increased luminance setting and during the adaptation period.

\* \* \* \* \*